(12) United States Patent
Sakai et al.

(10) Patent No.: US 11,513,313 B2
(45) Date of Patent: Nov. 29, 2022

(54) LENS APPARATUS AND CAMERA SYSTEM

(71) Applicant: CANON KABUSHIKI KAISHA, Tokyo (JP)

(72) Inventors: Hideki Sakai, Sakura (JP); Tadanori Okada, Utsunomiya (JP); Shunji Iwamoto, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 378 days.

(21) Appl. No.: 16/551,548

(22) Filed: Aug. 26, 2019

(65) Prior Publication Data
US 2020/0073082 A1    Mar. 5, 2020

(30) Foreign Application Priority Data

Aug. 31, 2018  (JP) .............................. JP2018-163187
Jul. 24, 2019  (JP) .............................. JP2019-136290

(51) Int. Cl.
| | |
|---|---|
| *G02B 7/09* | (2021.01) |
| *G02B 15/14* | (2006.01) |
| *G02B 7/02* | (2021.01) |
| *G02B 15/16* | (2006.01) |

(52) U.S. Cl.
CPC .............. *G02B 7/09* (2013.01); *G02B 7/021* (2013.01); *G02B 15/143105* (2019.08); *G02B 15/16* (2013.01)

(58) Field of Classification Search
CPC ............................... G02B 15/16; G02B 7/021; G02B 15/143105; G02B 7/09

USPC .......................................................... 359/684
See application file for complete search history.

(56) References Cited

U.S. PATENT DOCUMENTS

| | | | |
|---|---|---|---|
| 5,537,185 A | 7/1996 | Ohishi | |
| 2010/0027138 A1 | 2/2010 | Terada | |
| 2010/0046085 A1* | 2/2010 | Yumiki | ................. G03B 17/14 359/695 |
| 2010/0053768 A1* | 3/2010 | Yumiki | .......... G02B 15/144109 359/698 |
| 2010/0060781 A1* | 3/2010 | Yumiki | ................. G03B 17/14 348/E5.045 |

(Continued)

FOREIGN PATENT DOCUMENTS

| | | |
|---|---|---|
| CN | 1214459 A | 4/1999 |
| CN | 101238401 A | 8/2008 |

(Continued)

*Primary Examiner* — James R Greece
(74) *Attorney, Agent, or Firm* — Canon U.S.A., Inc. IP Division

(57) ABSTRACT

The lens apparatus includes an optical system, a voltage transformation unit, and an actuator. A first lens unit of the optical system is moved toward the object side during zooming from a wide-angle end to a telephoto end. The voltage transformation unit includes coils. The actuator is configured to be driven by a voltage output from the voltage transformation unit and to move a part of the lens units in the optical system during focusing. The coil is disposed at a position that is separated from a position of a most object-side surface of the optical system at the wide-angle end, toward the image side by a maximum or more moving amount of the first lens unit, and is closer to the object side than a most image-side surface of the optical system at the wide-angle end.

29 Claims, 19 Drawing Sheets

(56) References Cited

U.S. PATENT DOCUMENTS

| | | | |
|---|---|---|---|
| 2010/0060995 A1* | 3/2010 | Yumiki | ................ H04N 5/2254 |
| | | | 359/823 |
| 2011/0103789 A1* | 5/2011 | Honjo | ................ H04N 5/23209 |
| | | | 348/335 |
| 2011/0164154 A1* | 7/2011 | Honjo | .............. H04N 5/232941 |
| | | | 348/241 |
| 2017/0264794 A1 | 9/2017 | Park | |

FOREIGN PATENT DOCUMENTS

| | | |
|---|---|---|
| CN | 101675369 A | 3/2010 |
| CN | 102401973 A | 4/2012 |
| CN | 103201934 A | 7/2013 |
| CN | 104469105 A | 3/2015 |
| CN | 105388600 A | 3/2016 |
| CN | 105934697 A | 9/2016 |
| JP | 2001268427 A | 9/2001 |
| JP | 2005121891 A | 5/2005 |
| JP | 2011-090190 A | 5/2011 |
| JP | 4829380 B2 | 12/2011 |
| JP | 2014052429 A | 3/2014 |

\* cited by examiner

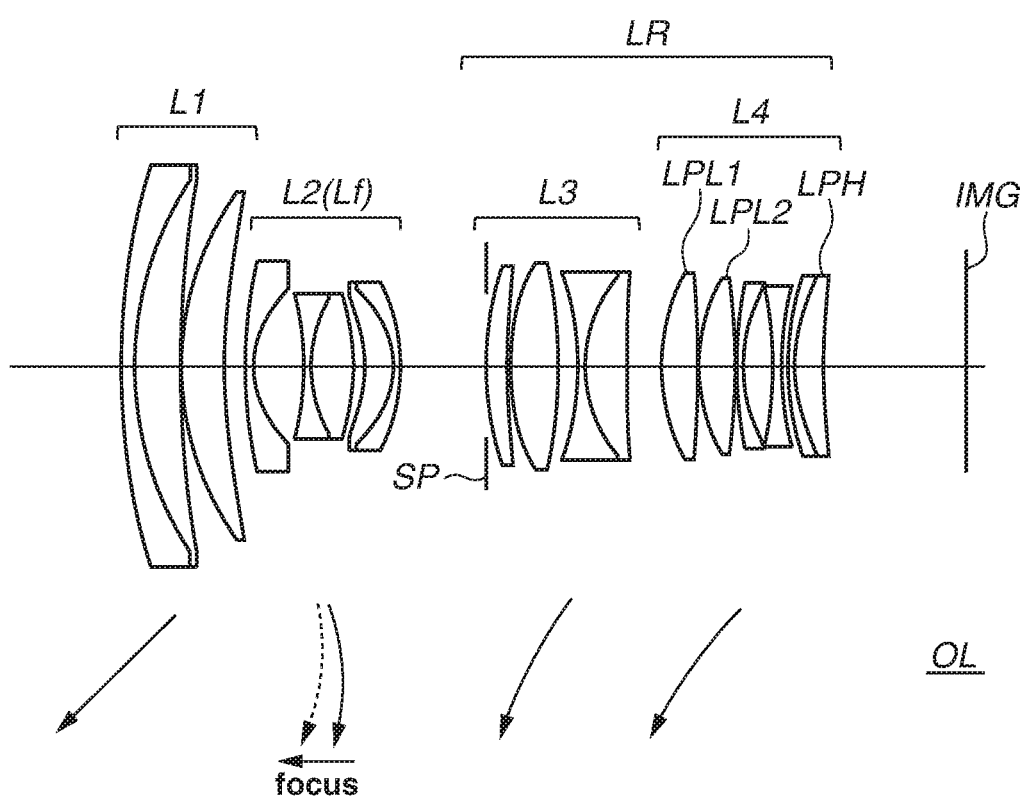

LENS APPARATUS AND CAMERA SYSTEM

BACKGROUND OF THE INVENTION

Field of the Invention

The aspect of the embodiments relates to a lens apparatus and a camera system.

Description of the Related Art

As a zoom lens that can relatively easily achieve high variable magnification, a positive lead zoom lens in which a lens unit having positive refractive power is disposed on the most object side is well-known. For example, Japanese Patent Application Laid-Open No. 2011-090190 discusses a zoom lens in which a lens unit having positive refractive power disposed on the most object side is moved toward the object side during zooming from a wide-angle end to a telephoto end. In the zoom lens, a fifth lens unit that has a relatively light weight is moved during focusing.

In a case where an attempt is made to further increase an aperture of the zoom lens discussed in Japanese Patent Application Laid-Open No. 2011-090190, large variation of aberration is easily produced during focusing. Further, to suppress the aberration variation, the weight of the lens unit moved during focusing (hereinafter, referred to as focusing unit) tends to be increased.

In a case where the weight of the focusing unit is relatively large, in order to improve driving efficiency of a motor to move the focusing unit, a booster circuit that boosts a voltage to be supplied to the motor is disposed. However, if the booster circuit is disposed at an improper position without considering a configuration of an optical system in a lens apparatus, an outer diameter of the lens apparatus may be increased, or noise may be superimposed on an image signal acquired by an imaging device of a camera due to a magnetic field generated by a coil included in the booster circuit.

SUMMARY OF THE INVENTION

According to an aspect of the embodiments, a lens apparatus includes an optical system, a voltage transformation unit, and an actuator. The optical system comprises a first lens unit having positive refractive power, a second lens unit having negative refractive power, and a rear lens group having positive refractive power disposed in this order from object side to image side. A distance of adjacent lens units is varied during zooming. The first lens unit is moved toward the object side during zooming from a wide-angle end to a telephoto end. The voltage transformation unit includes coils. The actuator is configured to be driven by a voltage output from the voltage transformation unit and to move a part of the lens units in the optical system during focusing. The coil is disposed at a position that is separated from a position of a most object-side surface of the optical system at the wide-angle end toward the image side by a maximum or more moving amount of the first lens unit, and is closer to the object side than both of the actuator and a most image-side surface of the optical system at the wide-angle end.

Further features of the disclosure will become apparent from the following description of exemplary embodiments with reference to the attached drawings.

BRIEF DESCRIPTION OF THE DRAWINGS

FIG. 6 is a cross-sectional view illustrating an optical system according to a first exemplary embodiment.

DESCRIPTION OF THE EMBODIMENTS

Figure 1A:
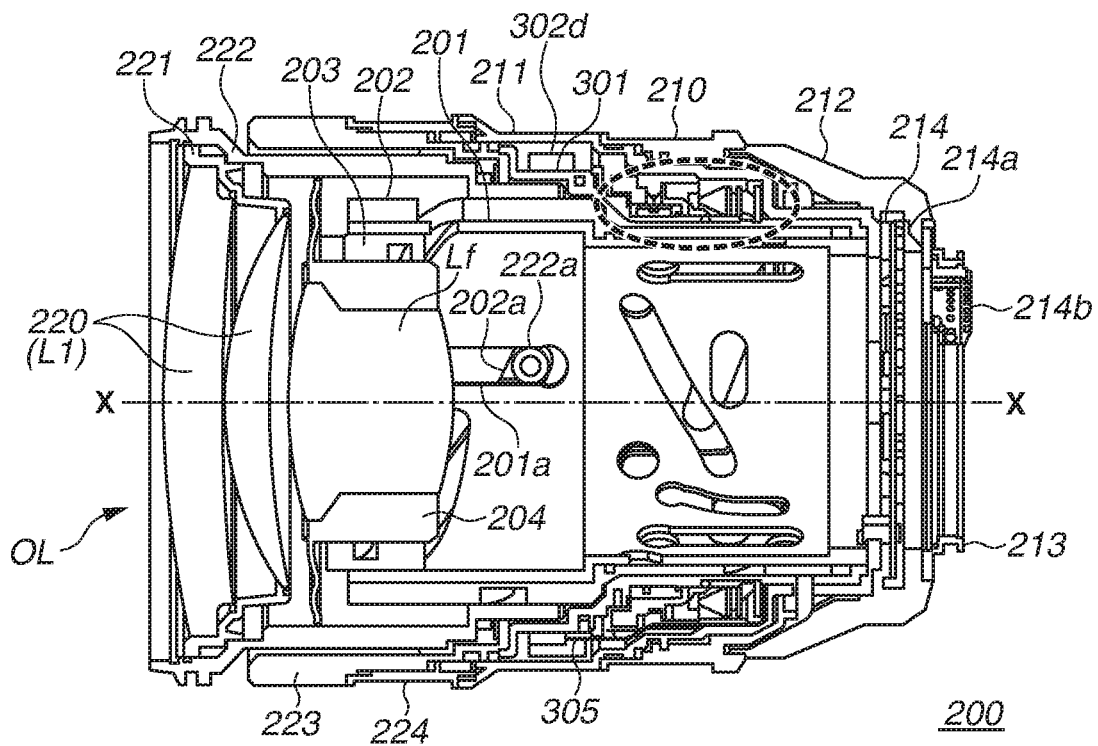
FIGS. 1A and 1B are diagrams each illustrating a configuration of a lens apparatus according to the first exemplary embodiment.

A lens apparatus and a camera system according to exemplary embodiments of the disclosure are described in detail below with reference to accompanying drawings. In the drawings, like components are denoted by like reference numerals, and overlapping description is omitted.

[Configuration of Lens Apparatus]

(Main Configuration)

Figure 1B:
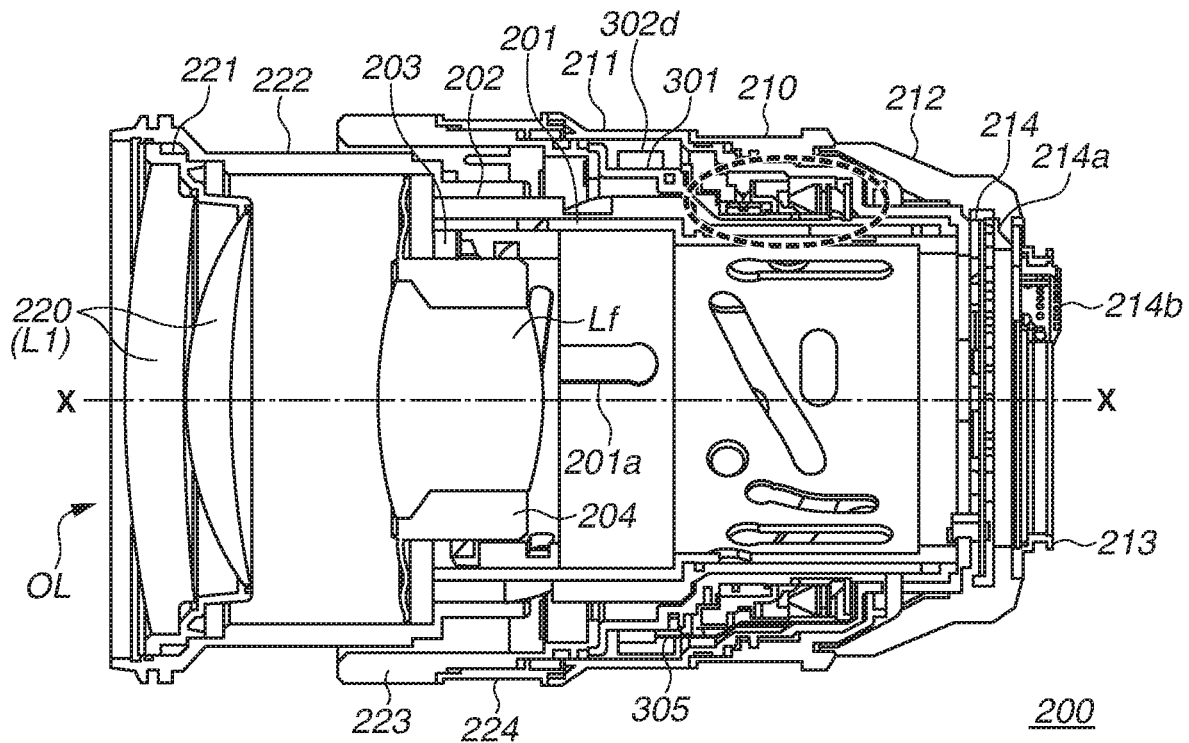

FIGS. 1A and 1B are diagrams each illustrating a configuration of a lens apparatus 200 according to a first exemplary embodiment. The lens apparatus 200 is an optical system OL variable in focal length (i.e., zoom lens). FIG. 1A is a cross-sectional view illustrating the lens apparatus 200 at a wide-angle end, and FIG. 1B is a cross-sectional view illustrating the lens apparatus 200 at a telephoto end.

The lens apparatus 200 is an interchangeable lens attachable/detachable to/from a camera body (described below). The lens apparatus 200 includes the optical system OL, a member (described below) that holds the optical system OL, a voltage transformation unit including a coil, and an actuator (described below) that moves a part of lens units of the optical system OL during focusing. An image formed by the optical system OL is read out as an image signal by an imaging device (described below) disposed inside the camera body.

First, a main configuration of the optical system OL is described with reference to FIG. 6. FIG. 6 is a diagram illustrating the configuration of the optical system OL according to an exemplary embodiment. The optical system OL includes a plurality of lens units. A distance of adjacent lens units is varied during zooming. The plurality of lens units consists of a first lens unit L1 having positive refractive power, a second lens unit L2 having negative refractive power, and a rear lens group LR having positive refractive power as a whole in an entire zoom range that are disposed in this order from object side to image side. During zooming from the wide-angle end to the telephoto end, the first lens unit L1 is moved toward the object side. Further, a part of the lens units (second lens unit L2 in FIG. 6) of the optical system OL functions as a focusing unit to be moved during focusing. The focusing unit is denoted by a reference numeral Lf in FIGS. 1A and 1B. A first lens and a second lens from the object side in the first lens unit L1 are denoted by a reference numeral 220 in FIGS. 1A and 1B.

Typically, in a case of a refractive power configuration like the optical system OL, an outer diameter of the first lens unit L1 tends to be larger than an outer diameter of the other lens unit. Further, since the first lens unit L1 is moved toward the object side during zooming, it is difficult to dispose the actuator, etc. that moves the focusing unit Lf on the object side or the outside (side in a direction orthogonal to optical axis) of the first lens unit L1.

Referring back to FIGS. 1A and 1B, the configuration other than the optical system OL is described. The expression "members are fixed to each other" used herein indicates that the members are fixed by a not-illustrated fixing means such as a screw and an adhesive so as to reduce relative displacement of the apparatus members in a certain direction.

A main appearance of the lens apparatus 200 is configured by an exterior barrel 211, a mount ring 212 disposed on the image side of the exterior barrel 211 to be fixed to the exterior barrel 211, and a mount portion 213 that is disposed on the image side of the mount ring 212 and fixed to the mount ring 212. A guide barrel 201 is disposed inside the exterior barrel 211 to be fixed to the exterior barrel 211.

(Zooming Mechanism)

A cam ring 202 is a member to be rotated integrally with a zoom ring 210 along with rotation operation of the zoom ring 210. The cam ring 202 is fixed to the guide barrel 201 so as to be located at a fixed position in an optical axis direction and rotatable in a rotation direction.

A holding member 221 holds the first lens unit L1 and is moved in the optical axis direction together with the first lens unit L1. The holding member 221 is fixed to a straight advance barrel 222. The straight advance barrel 222 includes cam followers 222a disposed at three positions in a circumferential direction with respect to the optical axis, and the cam followers 222a engage with a straight advance groove (guide groove) 201a of the guide barrel 201 and a cam 202a of the cam ring 202. When the zoom ring 210 is operated by a user, the cam ring 202 is rotated with respect to the guide barrel 201, and the straight advance barrel 222 and the holding member 221 are moved in the optical axis direction. As with the first lens unit L1, a holding member holding each of the other lens units movable during zooming is moved in the optical axis direction when the cam ring 202 is rotated with respect to the guide barrel 201.

(Focusing Mechanism)

The focusing unit Lf is held by a focusing lens barrel 204. A motor unit 100 is an actuator that moves the focusing unit Lf in the optical axis direction during focusing. A drive substrate 301 is a unit that boosts a voltage to be supplied to the motor unit 100 (voltage transformation unit). A control substrate 214 has a function as a control unit that controls driving of the motor unit 100. The control substrate 214 further has a function as a communication unit for communication with a camera. Specific functions and layout of the drive substrate 301, the control substrate 214, a flexible printed circuit board 214a (hereinafter, referred to as FPC board 214a), and an electrical contact 214b are described below.

Figure 2:
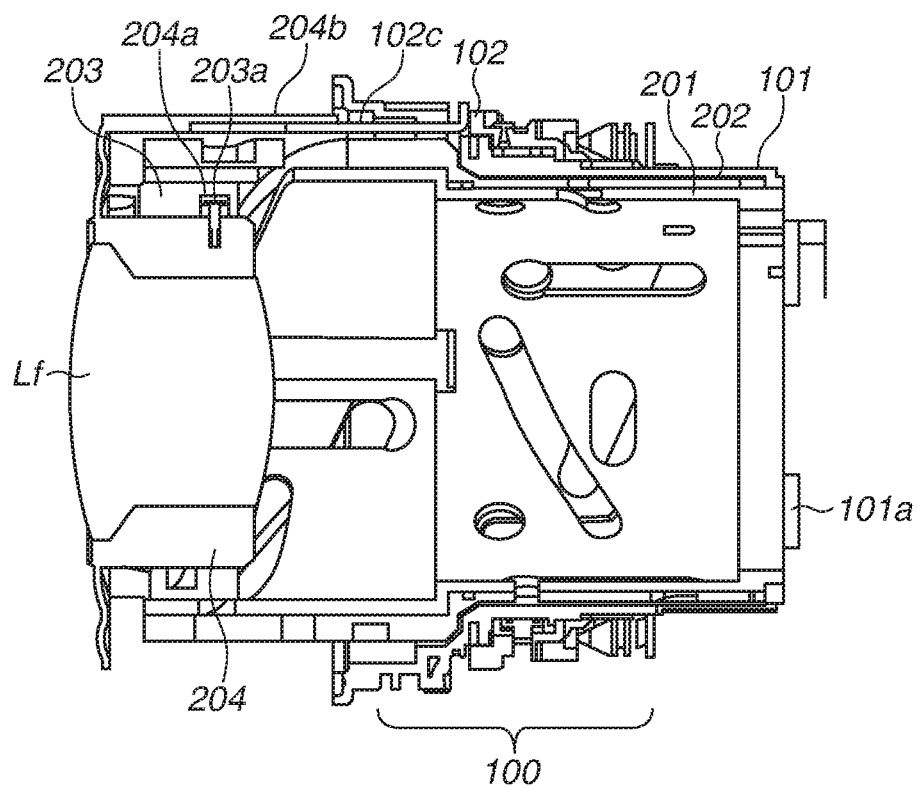
FIG. 2 is a diagram illustrating a focusing mechanism.

FIG. 2 is a diagram illustrating the focusing mechanism. The focusing lens barrel 204 includes three cam followers 204a on an outer periphery, and the cam followers 204a engage with a cam groove 203a of a focus cam ring 203. A focus key 102c fixed to a rotation ring 102 engages with a key groove 204b so as to be movable in the optical axis direction. The key groove 204b is provided at a part extended from an outer peripheral part of the focusing lens barrel 204 in the optical axis direction. Therefore, when the rotation ring 102 is rotated by driving of the motor unit 100, rotational force is transmitted to the focusing lens barrel 204 through the focus key 102c. Focus adjustment is performed when the focusing lens barrel 204 is extended to the object side while being rotated, and the focusing unit Lf is moved together with the focusing lens barrel 204.

(Configuration of Motor Unit)

Figure 3:
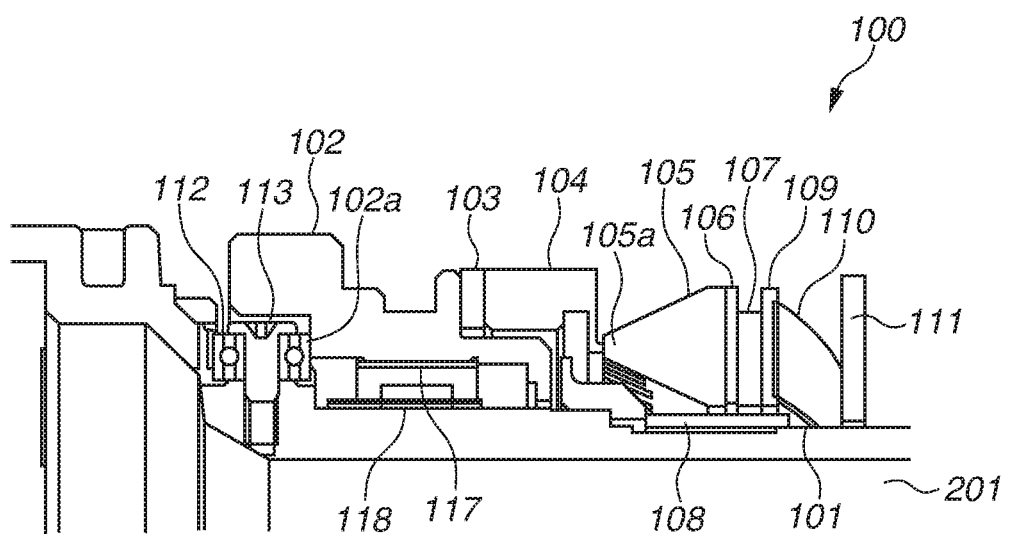
FIG. 3 is a cross-sectional view illustrating a configuration of a portion around a motor unit.

Next, a configuration of the motor unit 100 that moves the focusing unit Lf in the optical axis direction during focusing is described. FIG. 3 is a cross-sectional view illustrating a configuration of a portion around the motor unit 100 illustrated by a dashed line in FIGS. 1A and 1B. In FIG. 3, the motor unit 100 and the rotation ring 102 are annular members around the optical axis.

The motor unit 100 is an ultrasonic motor, and rotates the rotation ring 102 to indirectly move the focusing unit Lf in the optical axis direction.

The motor unit 100 includes a rotor (movable element) 104 and a stator 105. A piezoelectric element 106 is fixed to the stator 105, and vibrates based on an instruction from the control substrate 214. Vibration of the piezoelectric element 106 causes elliptic motion of a portion 105a (hereinafter, contact portion 105a) of the stator 105 contacting the rotor 104, and the rotor 104 that is disposed so as to be in constant contact with the contact portion 105a is accordingly rotated.

The stator 105 is supported by a fixed barrel 101 through the piezoelectric element 106, a buffer member 107, and a buffer member 108. Further, the stator 105 is connected to a biasing member 111 through the buffer member 107, a metal ring 109, and a washer 110, and is biased by the biasing member 111 to the rotor 104 side at predetermined pressing force. The pressing force to the stator 105 can be adjusted by displacing a position of the biasing member 111 in the optical axis direction.

The rotation ring 102 is disposed on an outer periphery of the fixed barrel 101 that is a cylindrical member fixed to the guide barrel 201. A rubber ring 103 is fixed to the rotation ring 102, and the rotor 104 is fixed to the rubber ring 103. Therefore, when the rotor 104 is rotated, the rubber ring 103 and the rotation ring 102 are rotated integrally with the rotor 104. The rotation ring 102 is in contact with bearings 112 through an end surface 102a, and is supported in the optical axis direction through the bearings 112 and a screw 113. The bearings 112 are disposed at equal intervals in the circumferential direction. A sensor 118 detects a periodic pattern formed on a scale 117 that is disposed on an inner periphery of the rotation ring 102. The control substrate 214 controls the motor unit 100 using a result of the detection. In other words, the control substrate 214 controls driving of the motor unit 100 to control a rotation angle and a speed of the rotation ring 102, and further to control a moving direction and a moving speed of the focusing unit Lf.

Figure 4:
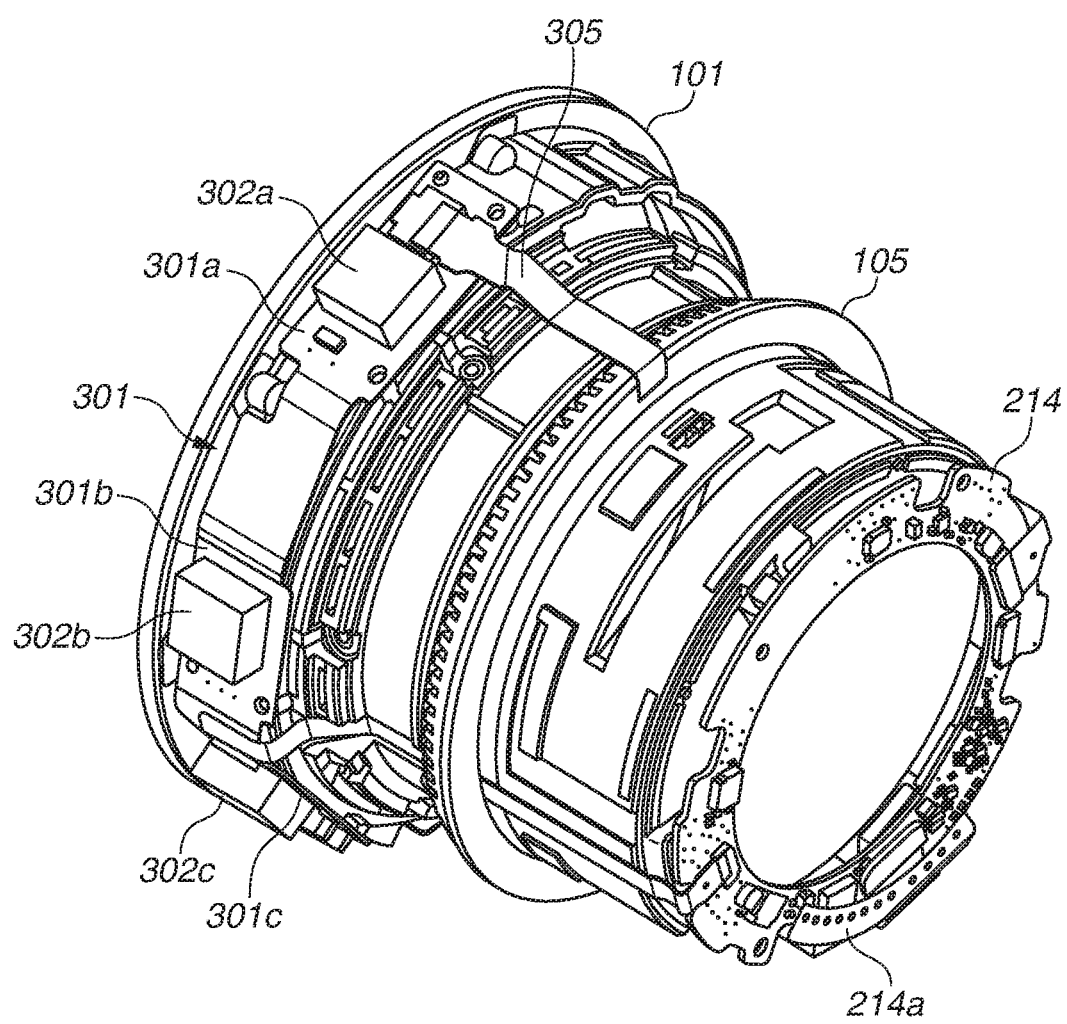
FIG. 4 is a perspective view illustrating a configuration of the motor unit.

Next, a circuit configuration to drive the motor unit 100 is described with reference to FIG. 4 and FIGS. 5A and 5B. FIG. 4 is a perspective view illustrating the motor unit 100 and illustrates a state where the rotation ring 102 and the rotor 104 have been detached.

In FIG. 4, the drive substrate 301 is a voltage transformation unit including coils 302a to 302d. In the present exemplary embodiment, the drive substrate 301 includes a booster circuit that boosts the voltage supplied (input) from the camera, with use of the coils 302a to 302d. The booster circuit is a common circuit, and a detailed description thereof is omitted. An output voltage from the booster circuit of the drive substrate 301 is supplied to the motor unit 100, and the motor unit 100 is driven by the output voltage.

Figure 5A:
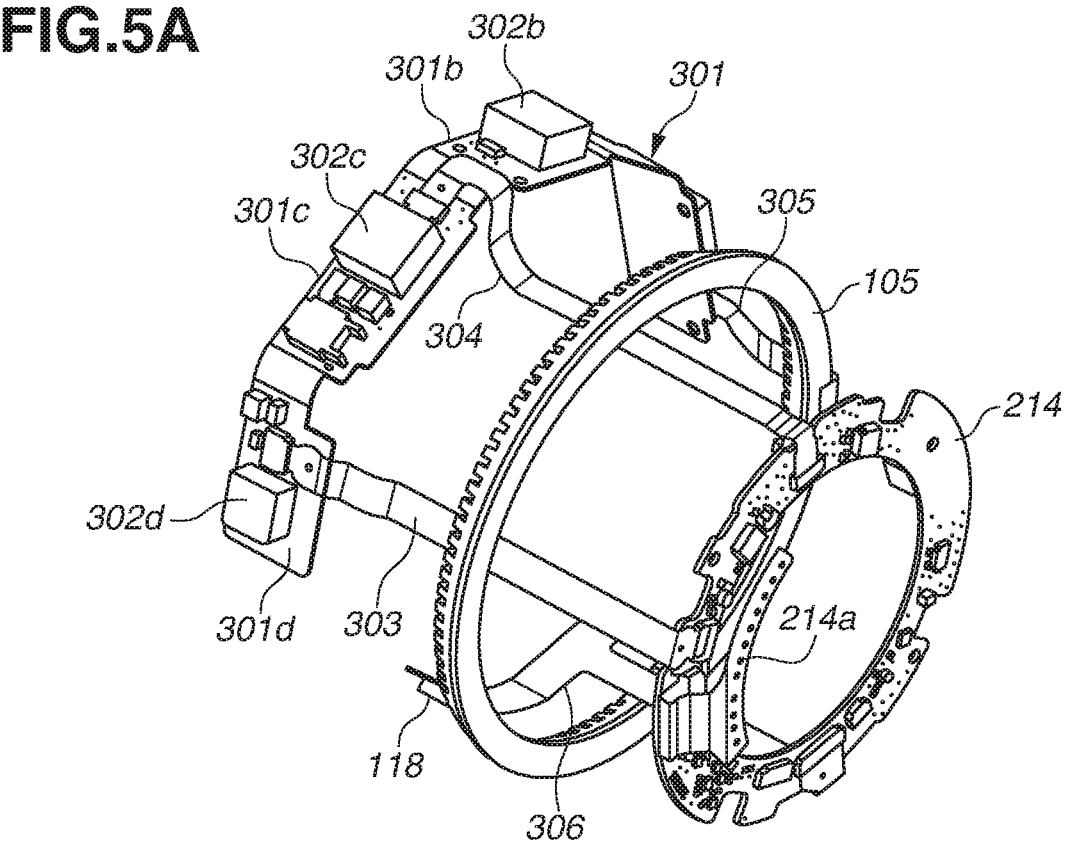
FIGS. 5A and 5B are main-part perspective views each illustrating connection of a drive substrate and a control substrate.
Figure 5B:
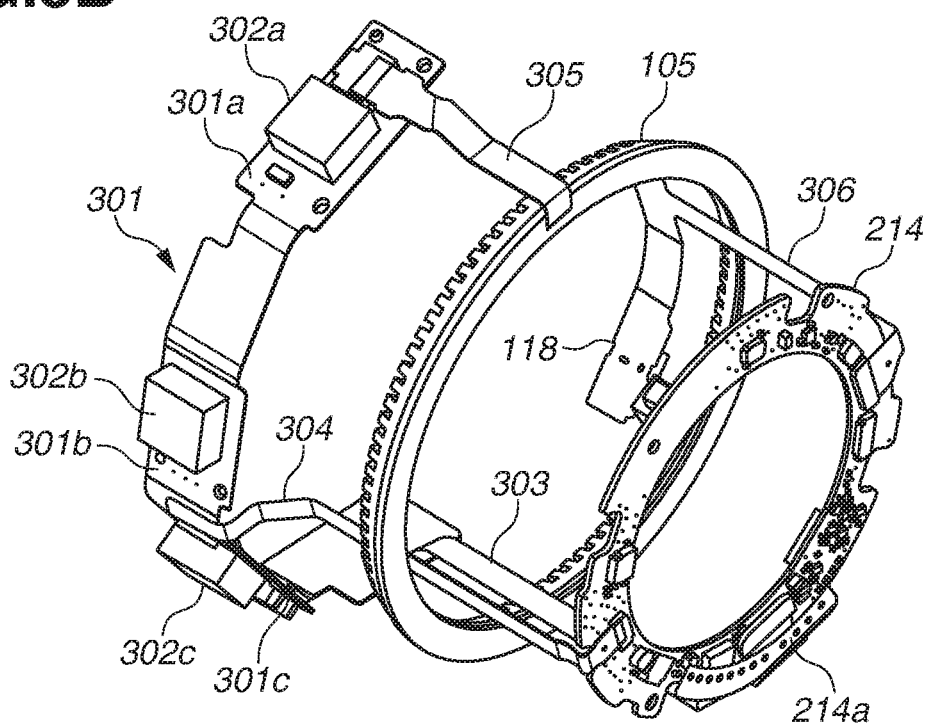

The drive substrate 301 is disposed so as to wind around the outer periphery of the fixed barrel 101, and includes a planar portions 301a, 301b, 301c, and 301d (planar portion 301d is illustrated in FIGS. 5A and 5B) on which electronic components are mounted.

The coil 302a is disposed on the planar portion 301a, the coil 302b is disposed on the planar portion 301b, the coil 302c is disposed on the planar portion 301c, and the coil 302d is disposed on the planar portion 301d. As described above, all of the coils 302a to 302d are not disposed on one planar portion but the coils 302a to 302d are distributed and disposed in the circumferential direction (direction around optical axis) of the optical system OL. To dispose the coils 302a to 302d in the above-described manner, the planar portions 301a to 301d are configured as a plurality of planes not parallel to one another. Such a configuration including the planar portions 301a to 301d and the coils 302a to 302d makes it possible to suppress increase in the outer diameter of the lens apparatus 200. The configuration including the planar portions 301a to 301d and the coils 302a to 302d is illustrative, and the configuration is not limited to the configuration illustrated in FIG. 4.

FIGS. 5A and 5B are main-part perspective views each illustrating connection of the drive substrate 301 and the control substrate 214. FIGS. 5A and 5B illustrate only components relating to electrical connection. The control substrate 214 controls driving of the motor unit 100, an electromagnetic diaphragm unit (not illustrated), etc. The planar portion 301a is connected to the stator 105 through an FPC board 305, the planar portion 301c is connected to the control substrate 214 through an FPC board 304, and the planar portion 301d is connected to the control substrate 214 through an FPC board 303. Power supplied from the camera through the electrical contact 214b (illustrated in FIGS. 1A and 1B) disposed on the mount portion 213 is supplied to the control substrate 214 through the FPC board 214a, and remaining power is supplied to the drive substrate 301 through the FPC board 303. In addition, a driving instruction transmitted from the camera through the electrical contact 214b (illustrated in FIGS. 1A and 1B) and a signal from a focus ring (not illustrated) are transmitted to a control circuit of the drive substrate 301 through the FPC board 304. The voltage boosted by the booster circuit including the coils 302a to 302d is transmitted to the piezoelectric element 106 of the stator 105 through the output FPC board 305. Rotation position information about the rotation ring 102 detected by the sensor 118 is transmitted to the control substrate 214 through an FPC board 306 for feedback control of the rotation ring 102.

Next, a layout of the drive substrate 301 including the coils 302a to 302d is described.

The drive substrate 301 is disposed such that the coils 302a to 302d are located at respective positions separated from a position of a most object-side surface of the optical system OL at the wide-angle end (object-side surface of lens on most object side in first lens unit L1) toward the image side by the maximum or more moving amount of the first lens unit L1.

A first reason for such layout is that the first lens unit L1 is moved toward the object side during zooming from the wide-angle end to the telephoto end, which makes it difficult to dispose the coils 302a to 302d further on the object side than the first lens unit L1 at the wide-angle end.

A second reason is that such layout is made to avoid increase in the outer diameter of the lens apparatus 200. If the coils 302a to 302d are disposed further on the optical-axis orthogonal direction side than the holding member 221 and the straight advance barrel 222 that is moved integrally with the holding member 221, the outer diameter of the lens apparatus 200 is increased. Therefore, the coil 302a to 302d are disposed further on the image side than the holding member 221 and the straight advance barrel 222 movable integrally with the holding member 221. The straight advance barrel 222 that is moved integrally with the holding member 221 holding the first lens unit L1 is often required to have a length in the optical axis direction equal to or greater than the maximum moving amount of the first lens unit L1 during zooming. Therefore, as described above, the positions of the coils 302a to 302d are specified using the position of the most object-side surface of the first lens unit L1 at the wide-angle end and the maximum moving amount of the first lens unit L1. As described above, the position of the holding member 221 holding the first lens unit L1 that has the largest outer diameter in the lens apparatus 200 and the positions of the coils 302a to 302d are displaced from each other in the optical axis direction, which suppresses increase in the outer diameter of the lens apparatus 200 and downsizes the lens apparatus 200.

Further, the drive substrate 301 is disposed such that the coils 302a to 302d are located at the respective positions further on the object side than the most image-side surface of the optical system OL at the wide-angle end. This makes it possible to dispose the coils 302a to 302d that may become generation sources of a noise at positions separated from an image plane IMG on which the imaging device of the camera is disposed. As a result, it is possible to reduce the noise in an image signal acquired by the imaging device. The positions of the coils 302a to 302d are positions separated toward the object side from the image plane IMG by twice or more as much as a back focus of the optical system OL at the wide-angle end. The "back focus" is a distance on the optical axis from a final surface (lens surface on most image side) of the optical system OL to a paraxial image plane, which is expressed in an air conversion length.

Further, the drive substrate 301 is disposed such that the coils 302a to 302d are disposed within the outermost diameter range of the holding member 221 and the straight advance barrel 222 when viewed from the optical axis direction. This makes it possible to suppress unnecessary increase of the outer diameter of the lens apparatus 200.

Further, the drive substrate 301 is disposed near the second lens unit L2. More specifically, the second lens unit L2 and the drive substrate 301 are disposed so as to at least partially overlap with each other at the wide-angle end when viewed from the optical-axis orthogonal direction. Since it is easy to configure the second lens unit L2 such that the outer diameter is optically small, the coils 302a to 302d can be disposed separately from the image plane IMG without increasing the outer diameter of the lens apparatus 200.

In the case of the large-diameter lens as with the optical system OL, the mass of the lens unit to be moved during focusing is increased, and the motor unit 100 is to have power which generates high torque. Accordingly, the motor unit 100 and the coils 302a to 302d provided on the drive substrate 301 tend to be increased in size. Therefore, in the present exemplary embodiment, the drive substrate 301 and the motor unit 100 are displaced from each other in the optical axis direction. This layout suppresses increase in the outer diameter of the lens apparatus 200. Further, the drive substrate 301 is disposed on the object side of the motor unit 100. Since the drive substrate 301 is disposed separately from the image plane IMG as much as possible, it becomes possible to reduce the noise in the image signal acquired by the imaging device disposed on the image plane IMG.

Further, the drive substrate 301 and the motor unit 100 are disposed further on the object side than the control substrate 214. This makes it possible to reduce influence of the magnetic field generated by the coils 302a to 302d on the drive substrate 301, and to reduce influence of vibration which occurs on the motor unit 100, on the image signal acquired by the imaging device. Alternatively, the drive substrate 301 may be disposed on the object side of the control substrate 214 and the motor unit 100 may be disposed on the image side of the control substrate 214.

Furthermore, the coils 302a to 302d are displaced from at least one of the straight advance groove 201a and the cam groove 203a. The term "displaced" used herein indicates that the coils 302a to 302d are not overlapping with at least one of the straight advance groove 201a and the cam groove 203a when viewed from the optical-axis orthogonal direction. This makes it possible to prevent the magnetic field generated by the coils 302a to 302d from coming around to the inside of the guide barrel 201 through the straight advance groove 201a and the cam groove 203a, and to reduce the noise in the image signal acquired by the imaging device.

Up to here, the case where the focusing unit Lf is the second lens unit L2 has been described as the exemplary embodiment; however, the configuration of the focusing unit Lf is not limited thereto.

Further, the case where the motor unit 100 is the ultrasonic motor has been described as an example; however, the specific configuration of the motor unit 100 is not limited thereto as long as the motor unit 100 can move the focusing unit Lf. Further, the case where the coils 302a to 302d are used in the booster circuit has been described as an example; however, the configuration is not limited thereto. It is sufficient for the drive substrate 301 to have a function as the voltage transformation unit. For example, the coils 302a to 302d may be used in a step-down circuit if desirable in relationship with the motor unit 100.

(Configuration of Optical System)

Next, a configuration of the optical system OL in the lens apparatus 200 according to the exemplary embodiment is described.

As described above, the optical system OL according to the present exemplary embodiment includes the plurality of lens units in which the distance of the adjacent lens units is varied during zooming. The plurality of lens units consists of the first lens unit L1 having positive refractive power, the second lens unit L2 having negative refractive power, and the rear lens group LR having positive refractive power as a whole that are disposed in this order from the object side to the image side. The high zoom ratio is achieved by movement of the first lens unit L1 toward the object side particularly during zooming from the wide-angle end to the telephoto end.

Further, the second lens unit L2 is moved toward the object side during focusing from an infinite-distance object to a short-distance object. This makes it possible to achieve excellent optical performance while reducing variation in coma aberration and magnification chromatic aberration during focusing over the entire focusing range even if the aperture of the optical system OL is large.

Further, the optical system OL satisfies at least one of the following conditional expressions (1) to (5). This makes it possible to achieve at least one of high optical performance of the optical system OL, downsizing of the lens apparatus 200, and noise reduction of the image signal acquired by the imaging device.

The conditional expression (1) is satisfied, $$0.5 < |M1|/\text{fw} < 1.3, \tag{1}$$

where M1 represents a moving amount of the first lens unit L1 during zooming from the wide-angle end to the telephoto end, and fw represents a focal length of the optical system OL at the wide-angle end.

The conditional expression (1) specifies a range of the moving amount of the first lens unit L1. If the moving amount of the first lens unit L1 becomes lower than a lower limit of the conditional expression (1), it is difficult to secure the zoom ratio, which is not preferable. If the moving amount of the first lens unit L1 becomes larger than an upper limit of the conditional expression (1), the holding member 221 and the straight advance barrel 222 are lengthened in the optical axis direction based on the moving amount of the first lens unit L1. Accordingly, the coils 302a to 302d are disposed closer to the image plane IMG, and noise reduction of the image signal acquired by the imaging device becomes difficult, which is not preferable.

The conditional expression (2) is satisfied, $$1.5 < B1\text{obj\_ea}/B2\text{img\_ea} < 3.0, \tag{2}$$

where B1obj_ea represents an effective diameter of the most object-side surface of the first lens unit L1, and B2img_ea represents an effective diameter of the most image-side surface of the second lens unit L2. The effective diameter used herein indicates a diameter on the lens surface of a light ray passing through a position farthest from the optical axis among light rays passing through the lens surface.

The conditional expression (2) specifies a ratio between the effective diameter of the lens on the most object side in the first lens unit L1 and the effective diameter of the lens on the most image side in the second lens unit L2.

The outer diameter of the optical system OL tends to be determined from the outer diameter of the first lens unit L1. Further, in the case where the coils 302a to 302d are disposed at respective positions satisfying the above-described configuration, the coils 302a to 302d can be disposed in a space formed by the first lens unit L1 and the second lens unit L2 having the outer diameter smaller than the outer diameter of the first lens unit 11. Accordingly, if the ratio becomes lower than a lower limit of the conditional expression (2) and the effective diameter of the most image-side surface of the second lens unit L2 is increased, it becomes difficult to dispose the coils 302a to 302d while configuring the lens apparatus 200 in a small size, which is not preferable. If the ratio exceeds an upper limit of the conditional expression (2), the effective diameter of the most object-side surface of the first lens unit L1 is increased and the outer diameter of the lens apparatus 200 is increased, which is not preferable.

When a third lens unit L3 is disposed on the most object side among the lens units configuring the rear lens group LR, the conditional expression (3) is satisfied, $$1.0 < B3\text{max\_ea}/\text{fw} < 2.0, \tag{3}$$

where B3max_ea represents the largest effective diameter among effective diameters of lenses configuring the third lens unit L3, and fw represents the focal length of the optical system OL at the wide-angle end.

The conditional expression (3) specifies a ratio between the largest effective diameter among the effective diameters of the lenses configuring the third lens unit L3 and the focal length of the optical system OL at the wide-angle end. If the ratio becomes lower than a lower limit of the conditional expression (3) and the maximum effective diameter of the third lens unit L3 is decreased, it becomes difficult to secure both of sufficiently-bright full-aperture F-number and a high zoom ratio at the telephoto end, which is not preferable. If the ratio exceeds an upper limit of the conditional expression (3) and the maximum effective diameter of the third lens unit L3 is increased, the outer diameter of the lens apparatus 200 is increased when the coils 302a to 302d are arranged, which is not preferable.

The conditional expression (4) is satisfied, $$0.3 < \text{skw}/\text{fw} < 1.1, \tag{4}$$

where skw represents the back focus of the optical system OL at the wide-angle end, and fw represents the focal length of the optical system OL at the wide-angle end.

The conditional expression (4) specifies a ratio between the back focus and the focal length of the optical system at the wide-angle end. If the ratio becomes lower than a lower limit of the conditional expression (4) and the back focus is shortened, the coils 302a to 302d are disposed relatively close to the image plane IMG. Accordingly, the noise in the image signal acquired by the imaging device is difficult to be reduced, which is not preferable. Further, the lens disposed on the most image side may interfere with a shutter mechanism of the camera or strong ghost may be easily generated, which is not preferable. If the ratio exceeds an upper limit of the conditional expression (4) and the back focus is lengthened, the optical system OL is to have a retrofocus configuration. This makes it difficult to correct distortion aberration, etc., which is not preferable.

The conditional expression (5) is satisfied, $$0.3 < T2/\text{To} < 1.0, \tag{5}$$

where T2 represents a distance on the optical axis from the most object-side surface of the second lens unit L2 to the most image-side surface of the second lens unit L2, and To represents a distance on the optical axis from the most object-side surface of the final lens unit that is disposed on the most image side among the lens units included in the rear lens group LR, to the most image-side surface of the final lens unit.

The conditional expression (5) specifies a ratio between the length of the second lens unit L2 and the length of the final lens unit in the optical axis direction. If the ratio becomes lower than a lower limit of the conditional expression (5) and the length of the final lens unit is increased in the optical axis direction, the diameter of the lens disposed on the most image side in the optical system OL is increased, or correction of curvature of field, etc. becomes difficult due to insufficient height variation of the light ray inside the second lens unit L2, which is not preferable. If the ratio exceeds an upper limit of the conditional expression (5) and the length of the second lens unit L2 is increased in the optical axis direction, the diameter of the lens disposed on the most object side in the optical system OL is increased, which is not preferable. Further, rapid focusing becomes difficult when the second lens unit L2 is moved during focusing, which is not preferable.

The numerical value range of each of the conditional expressions (1) to (5) is set as follows:

$$0.7 < |M1|/\text{fw} < 1.1; \tag{1a}$$

$$2.0 < B1\text{obj\_ea}/B2\text{img\_ea} < 2.8; \tag{2a}$$

$$1.2 < B3\text{max\_ea}/\text{fw} < 1.5; \tag{3a}$$

$$0.5 < \text{skw}/\text{fw} < 1.0; \tag{4a}$$

$$0.7 < T2/\text{To} < 0.95. \tag{5a}$$

Next, exemplary embodiments of the optical system OL are described with reference to FIG. 6 to FIG. 17C. In cross-sectional views of the optical system OL illustrated in FIGS. 6, 8, 10, 12, 14, and 16, the image plane IMG corresponds to a disposed position of the imaging device in the camera.

Aberration diagrams illustrated in FIGS. 7A to 7C, 9A to 9C, 11A to 11C, 13A to 13C, 15A to 15C, and 17A to 17C are a spherical aberration diagram, an astigmatism diagram, a distortion aberration diagram, and a chromatic aberration diagram in this order from left to right. In the spherical aberration diagram, a solid line indicates a Fraunhofer d-line (wavelength of 587.6 nm), and an alternate long and two short dashes line indicates a g-line (wavelength of 435.8 nm). In the astigmatism diagram, a solid line ΔS indicates a sagittal ray, and a dashed line ΔM indicates a meridional ray. A solid line in the distortion aberration diagram indicates the d-line, and an alternate long and two short dashes line in the chromatic aberration diagram indicates a g-line.

Figure 7A:
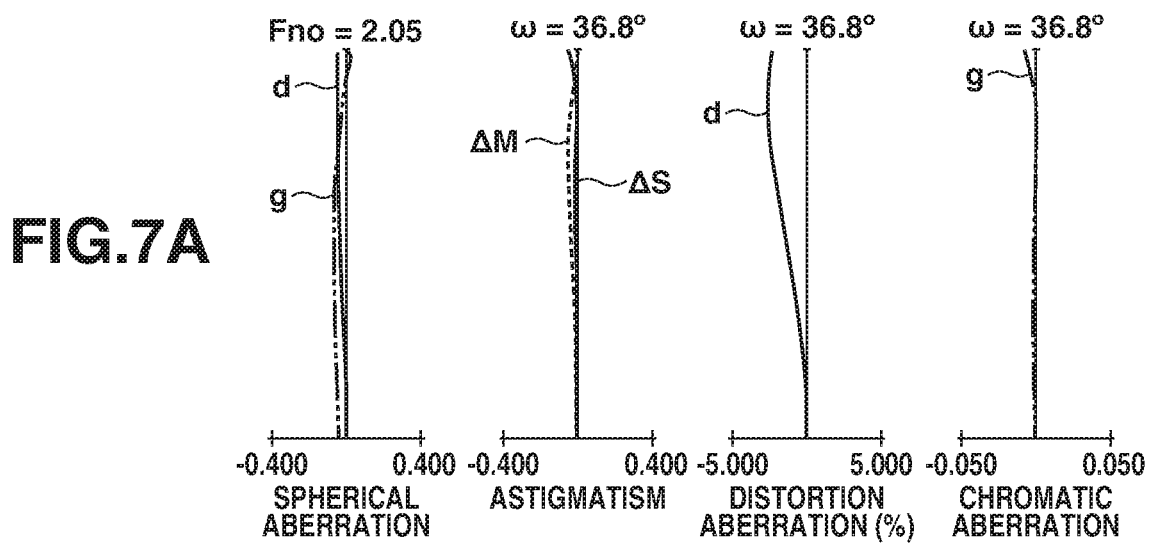
FIGS. 7A to 7C are aberration diagrams of the optical system according to the first exemplary embodiment.
Figure 7B:
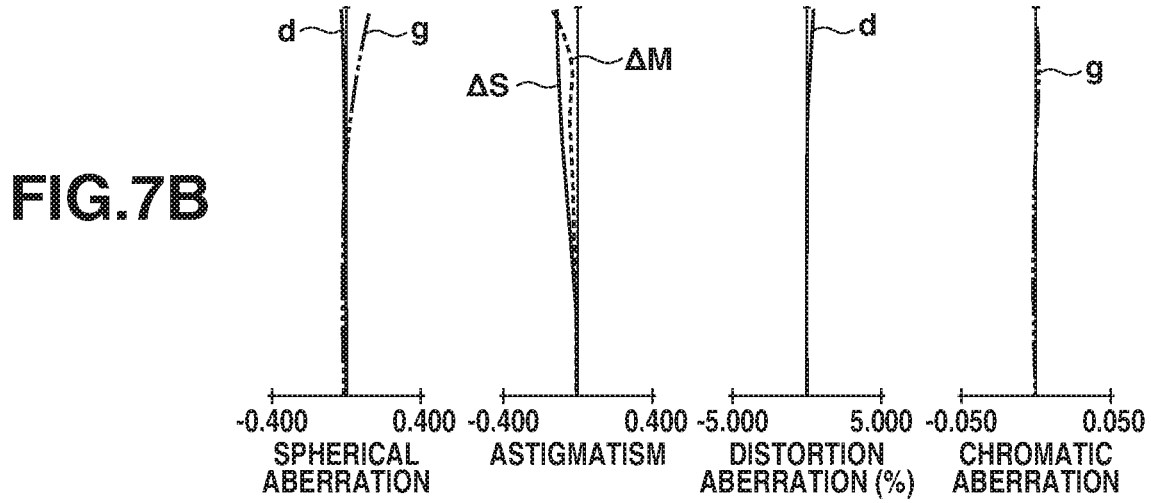
Figure 7C:
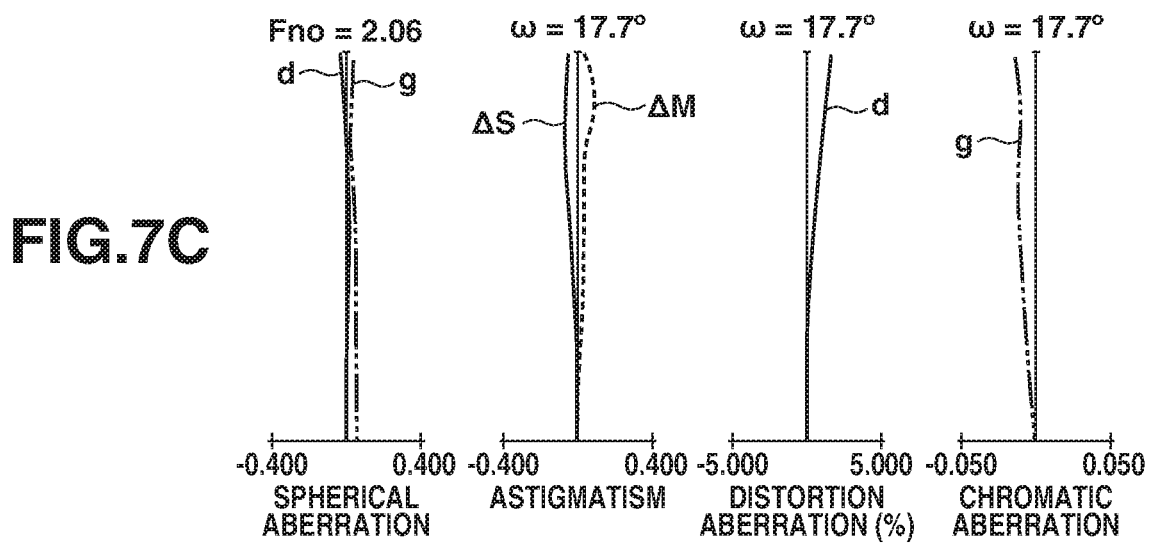

An optical system OL according to each of first to third exemplary embodiments is described. FIG. 6 is a cross-sectional view illustrating the optical system OL according to the first exemplary embodiment at a wide-angle end. FIG. 7A is an aberration diagram at a wide-angle end when an infinite-distance object is in focus, FIG. 7B is an aberration diagram at an intermediate position when the infinite-distance object is in focus, and FIG. 7C is an aberration diagram at a telephoto end when the infinite-distance object is in focus.

Figure 8:
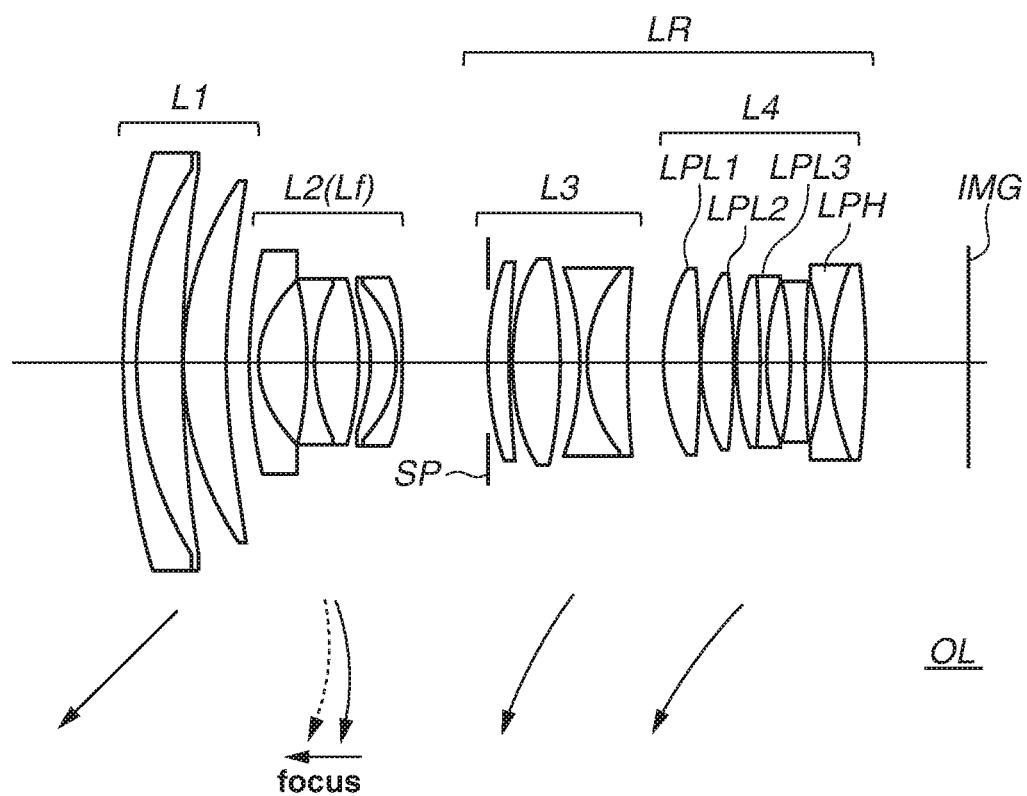
FIG. 8 is a cross-sectional view illustrating an optical system according to a second exemplary embodiment.
Figure 9A:
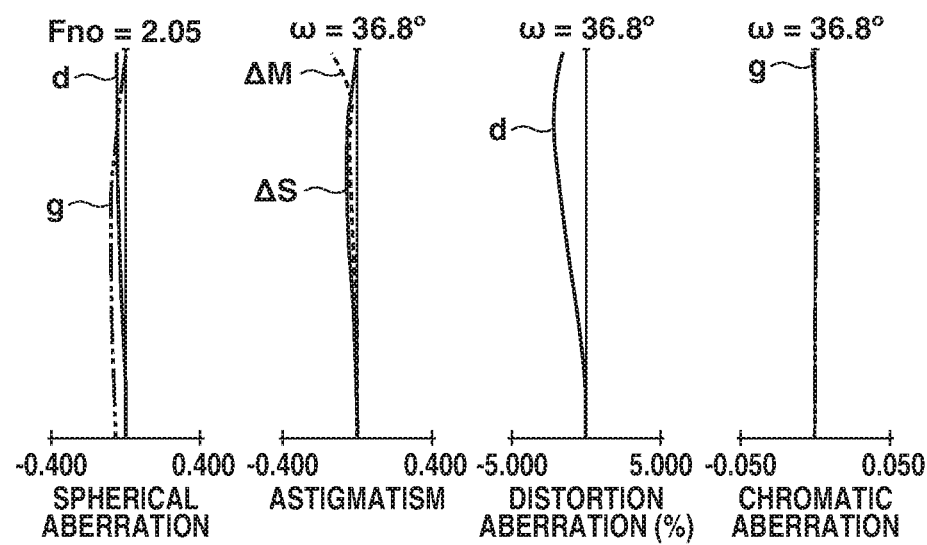
FIGS. 9A to 9C are aberration diagrams of the optical system according to the second exemplary embodiment.
Figure 9B:
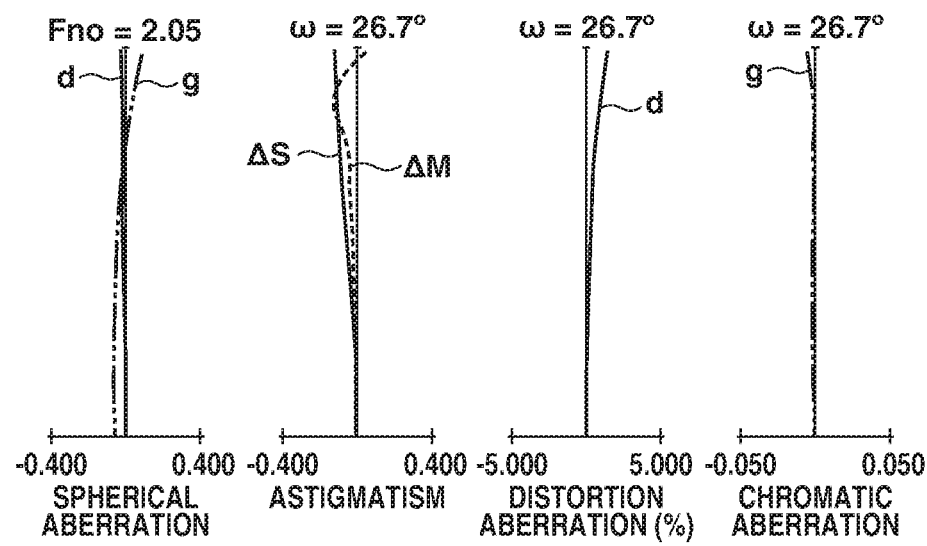
Figure 9C:
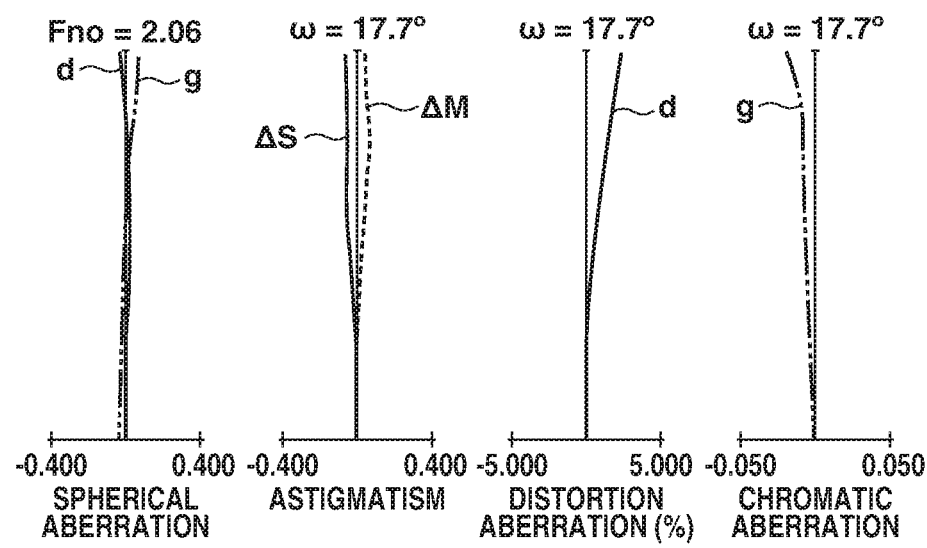

FIG. 8 is a cross-sectional view illustrating the optical system OL according to the second exemplary embodiment at the wide-angle end. FIG. 9A is an aberration diagram at the wide-angle end when an infinite-distance object is in focus, FIG. 9B is an aberration diagram at the intermediate position when the infinite-distance object is in focus, and FIG. 9C is an aberration diagram at the telephoto end when the infinite-distance object is in focus.

Figure 10:
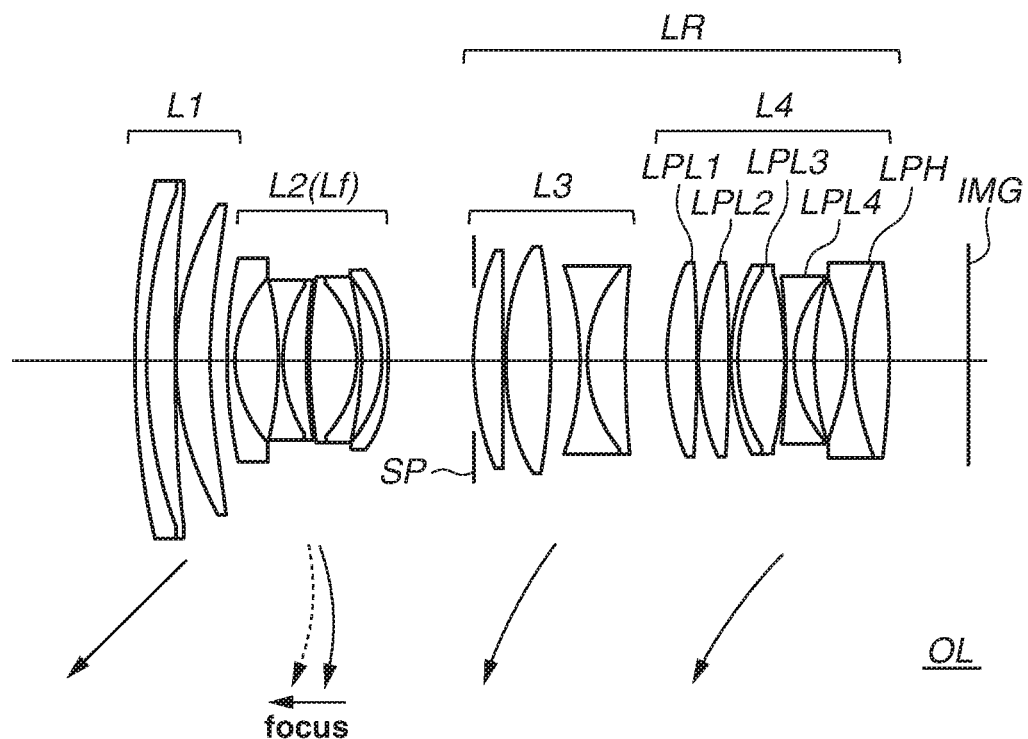
FIG. 10 is a cross-sectional view illustrating an optical system according to a third exemplary embodiment.
Figure 11A:
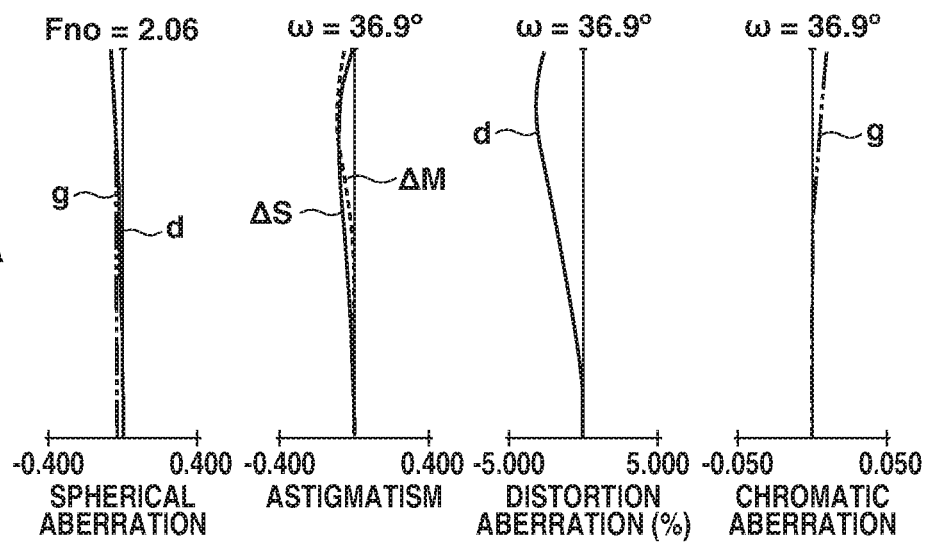
FIGS. 11A to 11C are aberration diagrams of the optical system according to the third exemplary embodiment.
Figure 11B:
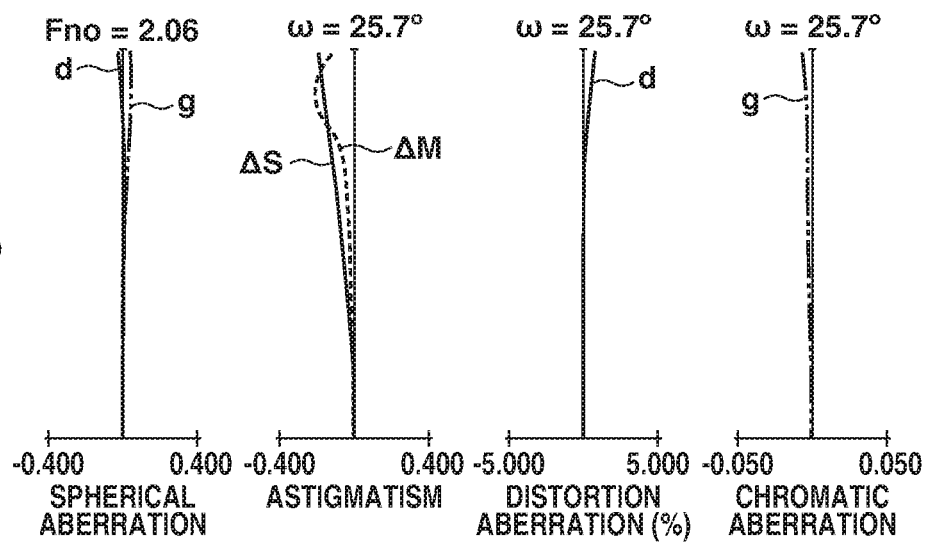
Figure 11C:
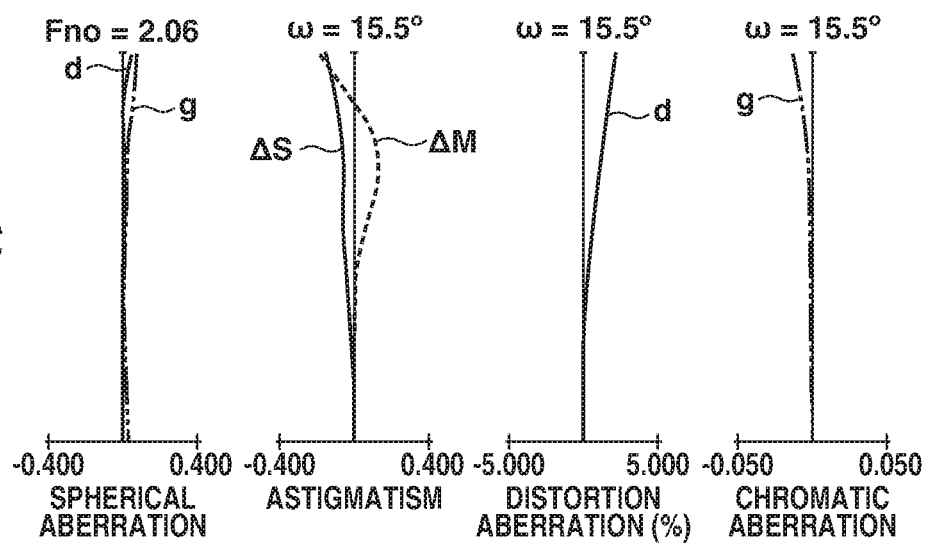

FIG. 10 is a cross-sectional view illustrating the optical system OL according to the third exemplary embodiment at the wide-angle end. FIG. 11A is an aberration diagram at the wide-angle end when an infinite-distance object is in focus, FIG. 11B is an aberration diagram at the intermediate position when the infinite-distance object is in focus, and FIG. 11C is an aberration diagram at the telephoto end when the infinite-distance object is in focus.

The optical system OL according to each of the first to third exemplary embodiments consists of the first lens unit L1 having positive refractive power, the second lens unit L2 having negative refractive power, the third lens unit L3 having positive refractive power, and a fourth lens unit L4 having positive refractive power that are disposed in this order from the object side to the image side. In other words, the rear lens group LR having positive refractive power in an entire zoom range consists of the third lens unit L3 and the fourth lens unit L4.

In the optical system OL according to each of the first to third exemplary embodiments, during zooming from the wide-angle end to the telephoto end, the first lens unit L1 is moved toward the object side, the second lens unit L2 is moved toward the image side and is then moved toward the object side, and the third lens unit L3 and the fourth lens unit L4 are moved toward the object side. During focusing from the infinite-distance object to the short-distance object, the second lens unit L2 is moved toward the object side.

The optical systems according to the first to third exemplary embodiments are different in the number of lenses in each of the lens units, and different in the refractive index and the shape of each of the lenses configuring the optical system OL, etc. from one another.

Figure 12:
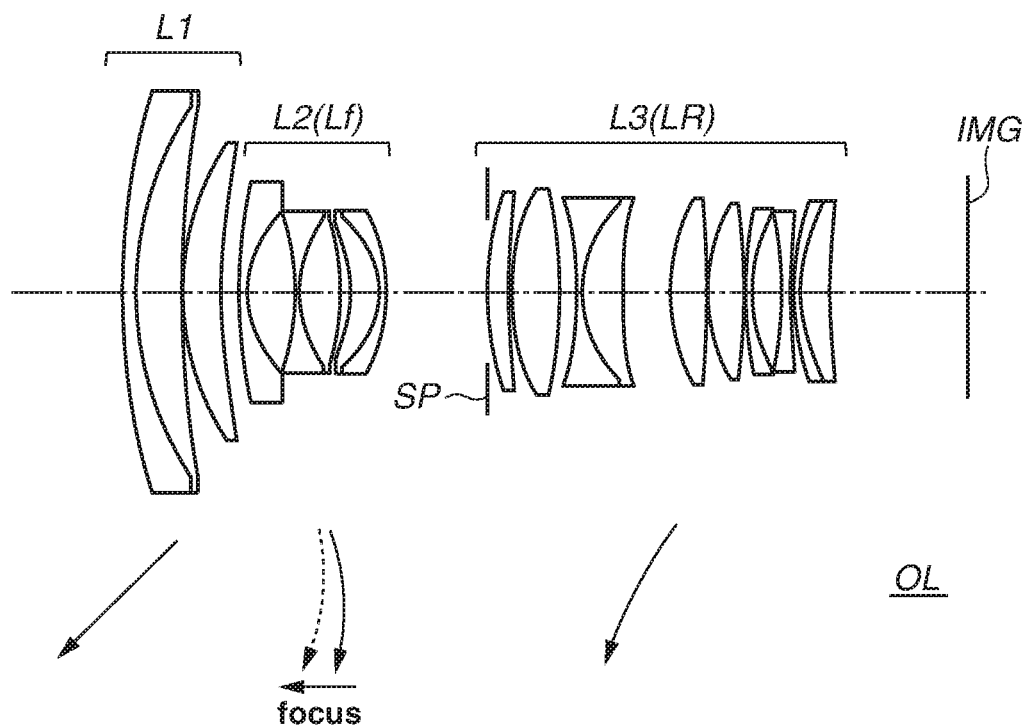
FIG. 12 is a cross-sectional view illustrating an optical system according to a fourth exemplary embodiment.
Figure 13A:
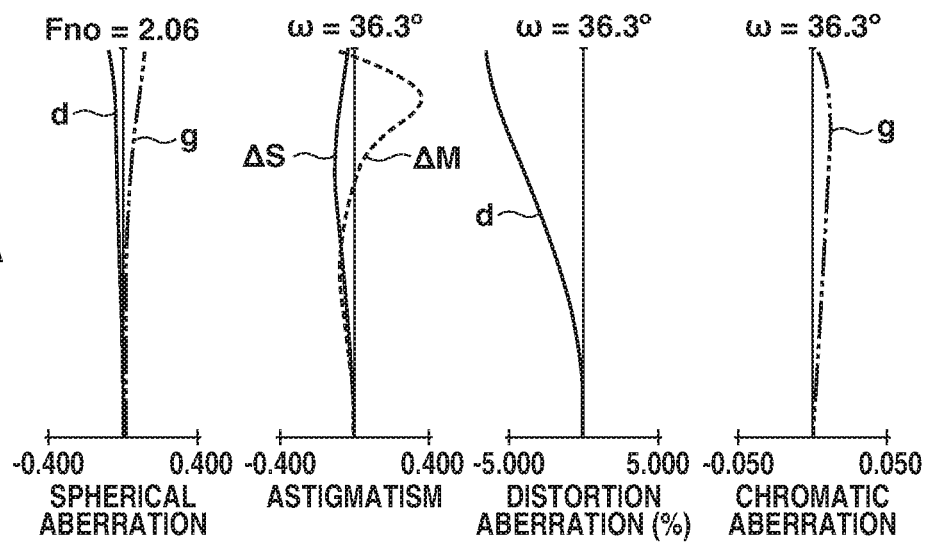
FIGS. 13A to 13C are aberration diagrams of the optical system according to the fourth exemplary embodiment.
Figure 13B:
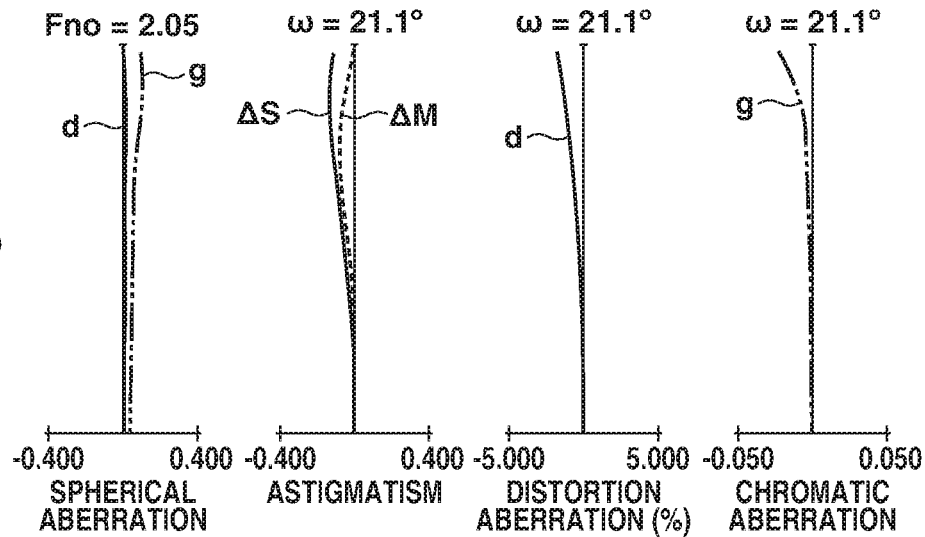
Figure 13C:
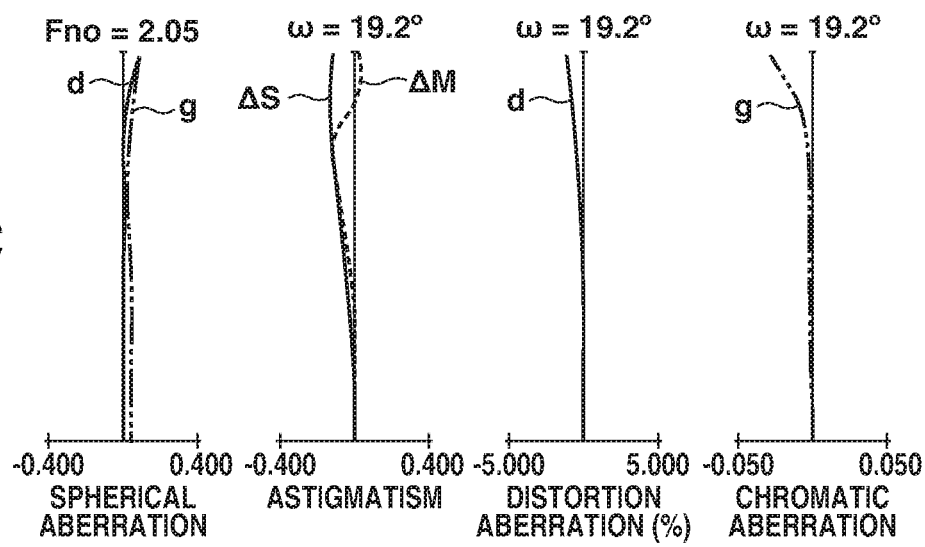

Next, an optical system OL according to a fourth exemplary embodiment is described. FIG. 12 is a cross-sectional view illustrating the optical system OL according to the fourth exemplary embodiment at the wide-angle end. FIG. 13A is an aberration diagram at the wide-angle end when an infinite-distance object is in focus, FIG. 13B is an aberration diagram at the intermediate position when the infinite-distance object is in focus, and FIG. 13C is an aberration diagram at the telephoto end when the infinite-distance object is in focus.

The optical system OL according to the fourth exemplary embodiment consists of the first lens unit L1 having positive refractive power, the second lens unit L2 having negative refractive power, and the third lens unit having positive refractive power that are disposed in this order from the object side to the image side. In other words, the rear lens group LR having positive refractive power in an entire zoom range consists of the third lens unit L3.

During zooming from the wide-angle end to the telephoto end, the first lens unit L1 is moved toward the object side, the second lens unit L2 is moved toward the image side and then moved toward the object side, and the third lens unit is moved toward the object side. During focusing from the infinite-distance object to the short-distance object, the second lens unit L2 is moved toward the object side.

Figure 14:
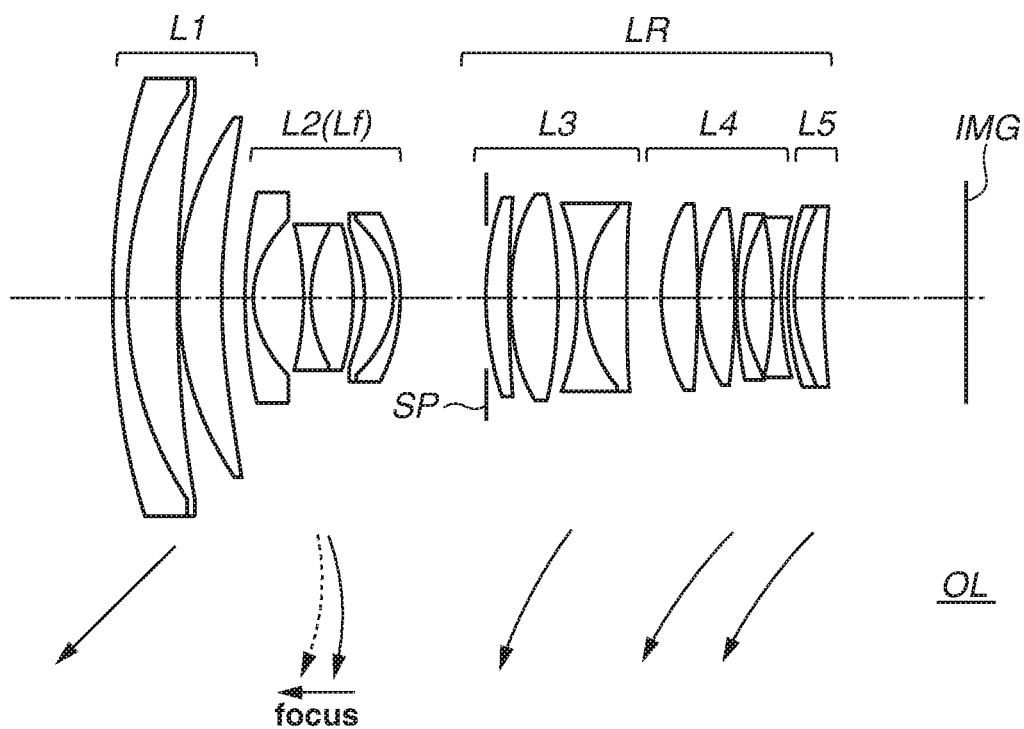
FIG. 14 is a cross-sectional view illustrating an optical system according to a fifth exemplary embodiment.
Figure 15A:
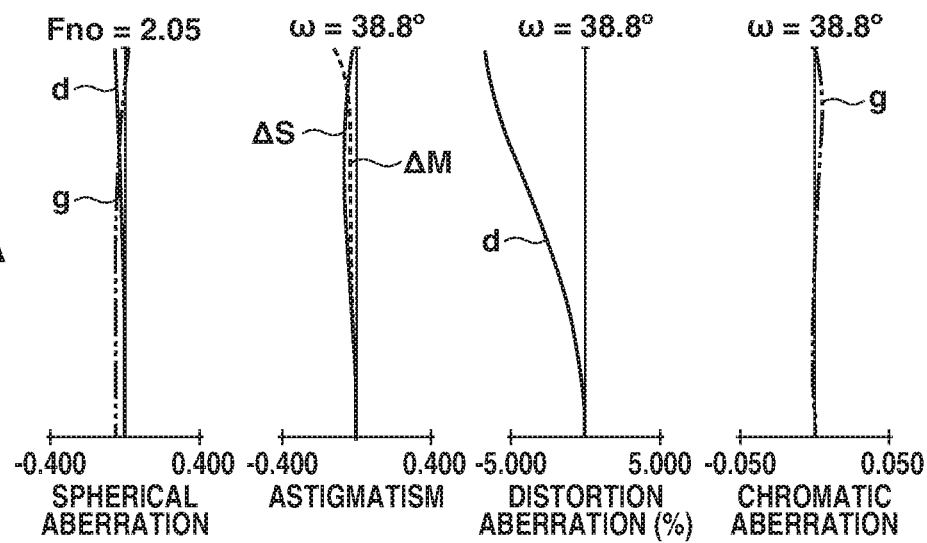
FIGS. 15A to 15C are aberration diagrams of the optical system according to the fifth exemplary embodiment.
Figure 15B:
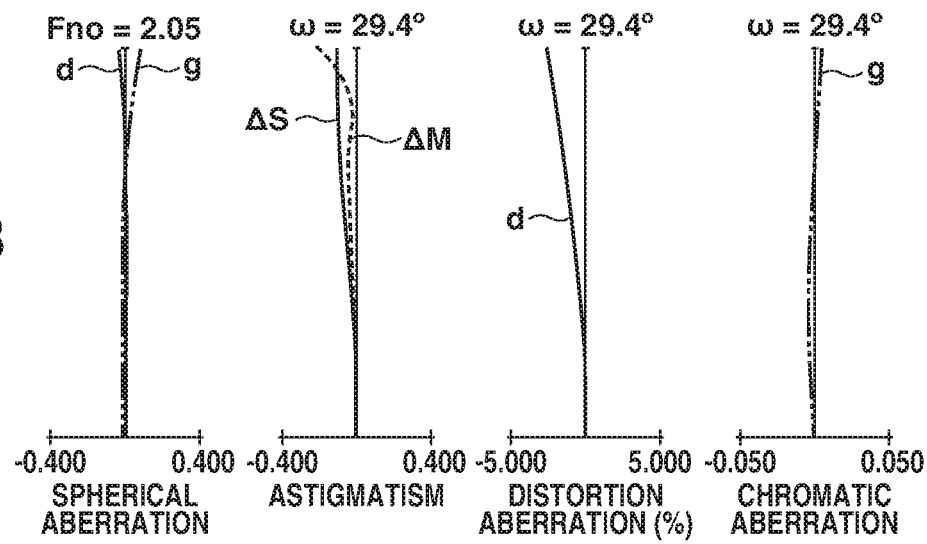
Figure 15C:
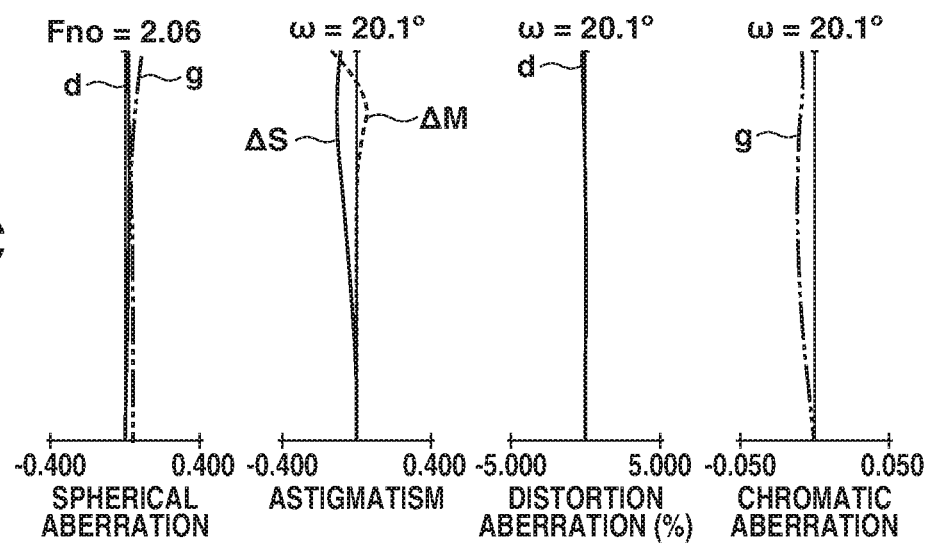

Next, an optical system OL according to a fifth exemplary embodiment is described. FIG. 14 is a cross-sectional view illustrating the optical system OL according to the fifth exemplary embodiment at the wide-angle end. FIG. 15A is an aberration diagram at the wide-angle end when an infinite-distance object is in focus, FIG. 15B is an aberration diagram at the intermediate position when the infinite-distance object is in focus, and FIG. 15C is an aberration diagram at the telephoto end when the infinite-distance object is in focus.

The optical system OL according to the fifth exemplary embodiment consists of the first lens unit L1 having positive refractive power, the second lens unit L2 having negative refractive power, the third lens unit L3 having positive refractive power, the fourth lens unit L4 having positive refractive power, and a fifth lens unit L5 having positive refractive power that are disposed in this order from the object side to the image side. In other words, the rear lens group LR having positive refractive power in an entire zoom range consists of the third lens unit L3, the fourth lens unit L4, and the fifth lens unit L5.

During zooming from the wide-angle end to the telephoto end, the first lens unit L1 is moved toward the object side, the second lens unit L2 is moved toward the image side and then moved toward the object side, and the third lens unit L3, the fourth lens unit L4, and the fifth lens unit L5 are moved toward the object side. During focusing from the infinite-distance object to the short-distance object, the second lens unit L2 is moved toward the object side.

An exemplary embodiment according to the present disclosure is not only applied to a so-called positive lead zoom lens, in which a lens unit disposed on the most object side has positive refractive power, but can be applied also to a so-called negative lead zoom lens, in which a lens unit disposed on the most object side has negative refractive power. An optical system OL according to a sixth exemplary embodiment is described below as the negative lead zoom lens.

Figure 16:
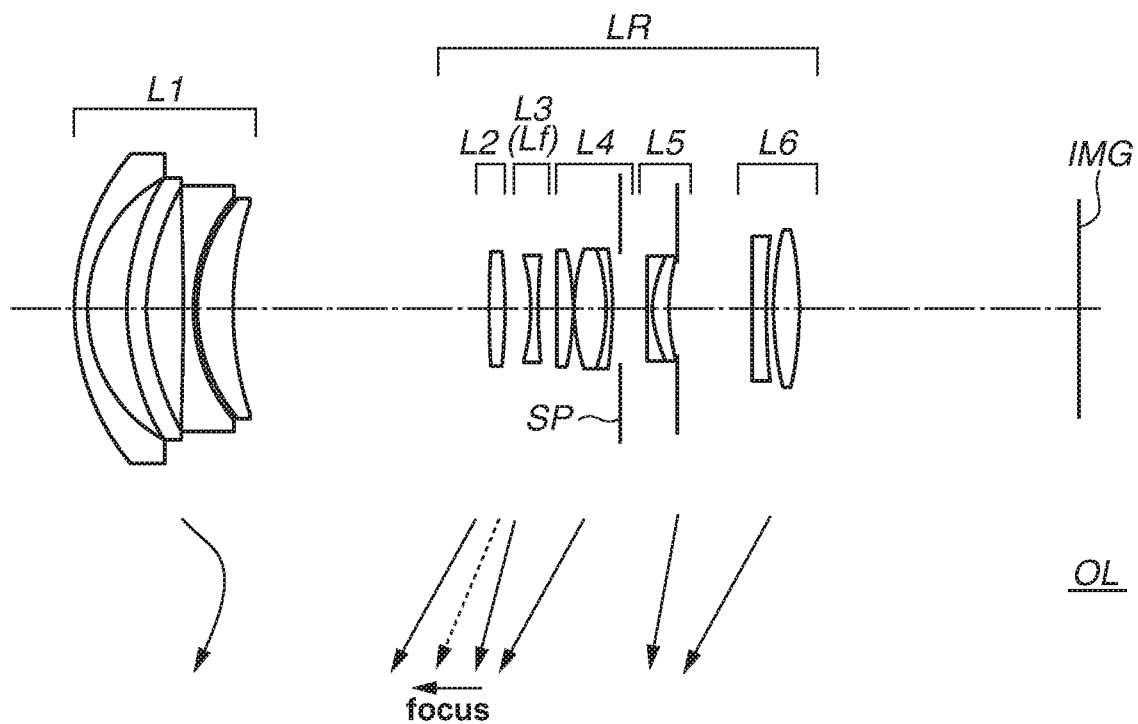
FIG. 16 is a cross-sectional view illustrating an optical system according to a sixth exemplary embodiment.
Figure 17A:
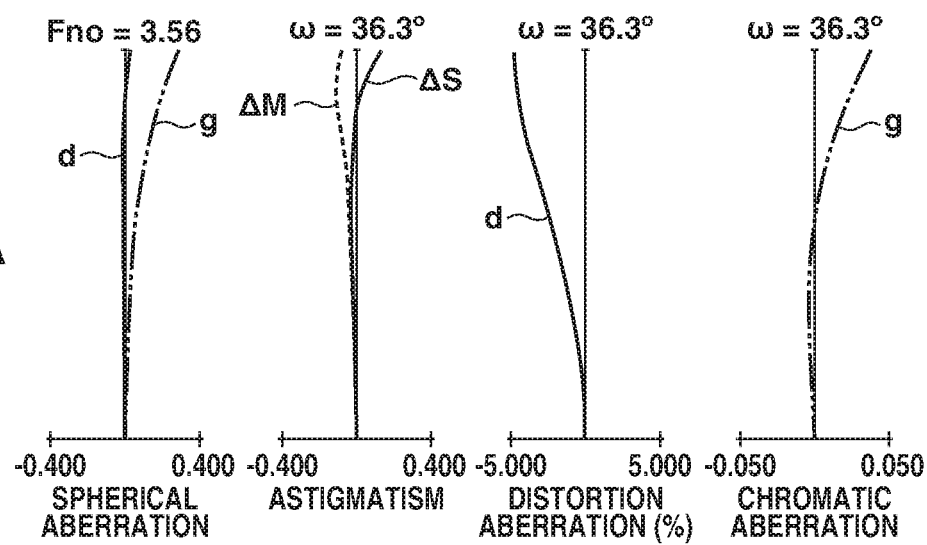
FIGS. 17A to 17C are aberration diagrams of the optical system according to the sixth exemplary embodiment.
Figure 17B:
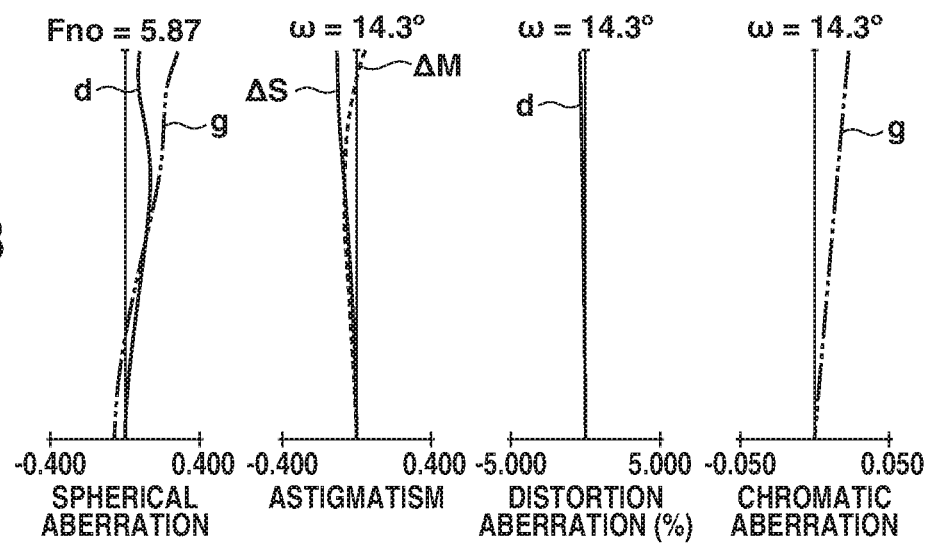
Figure 17C:
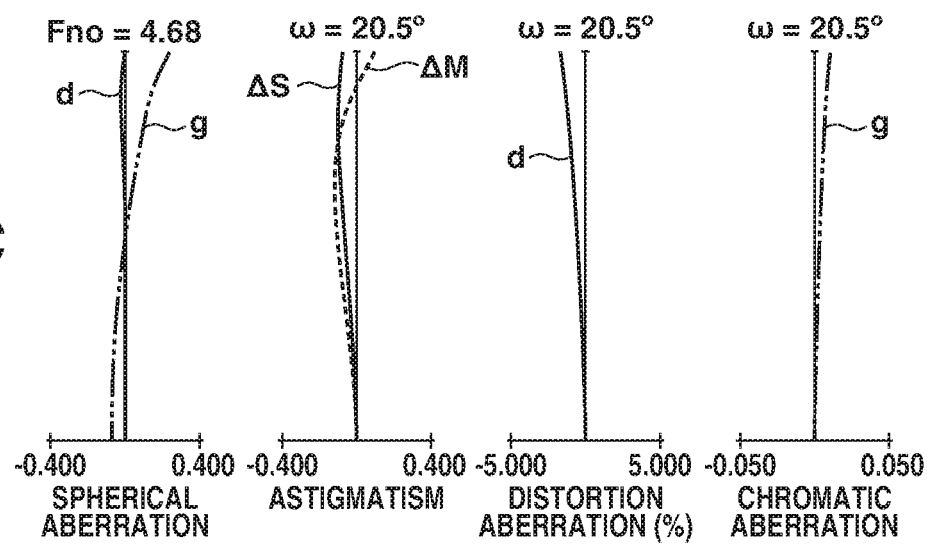

FIG. 16 is a cross-sectional view illustrating an optical system according to a sixth exemplary embodiment at a wide-angle end. FIG. 17A is an aberration diagram at a wide-angle end when an infinite-distance object is in focus, FIG. 17B is an aberration diagram at an intermediate position when the infinite-distance object is in focus, and FIG. 17C is an aberration diagram at a telephoto end when the infinite-distance object is in focus.

The optical system OL according to the exemplary embodiment 6, consists of a first lens unit L1 having negative refractive power, a second lens unit L2 having positive refractive power, a third lens unit L3 having negative refractive power, a fourth lens unit L4 having positive refractive power, a fifth lens unit L5 having negative refractive power, and a sixth lens unit L6 having positive refractive power. The second lens unit L2 to the sixth lens unit L6 is a rear lens group having positive refractive power as a whole.

After the first lens unit L1 is moved toward the image side, the first lens unit L1 is moved toward the object side during zooming from a wide-angle end to a telephoto end, while the second lens unit L2, the third lens unit L3, the fourth lens unit L4, the fifth lens unit L5, and the sixth lens unit L6 are moved toward the object side. The third lens unit L3 is moved toward the object side during focusing from an infinite-distance object to a short-distance object.

Figure 18A:
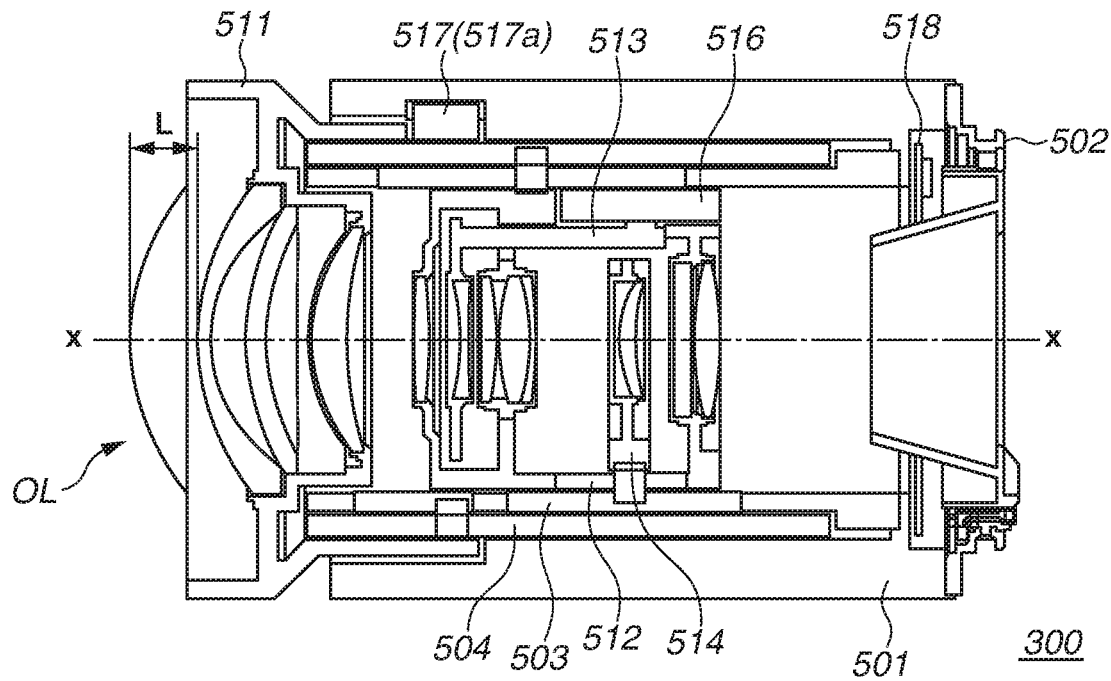
FIG. 18A and 18B are diagrams each illustrating a configuration of a lens apparatus according to the second exemplary embodiment.
Figure 18B:
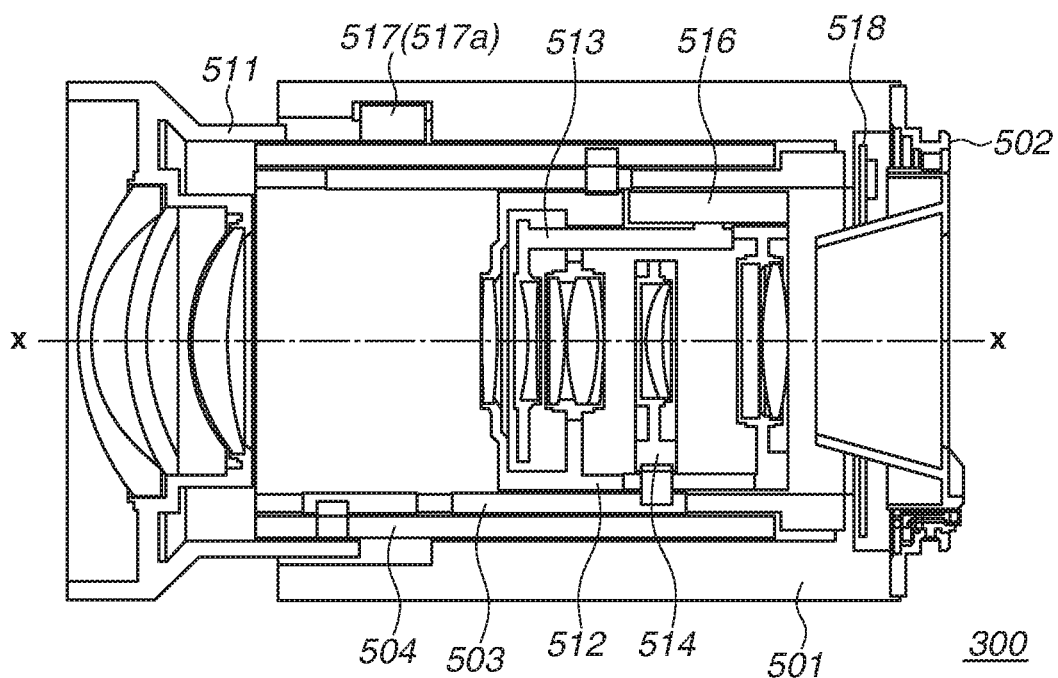

FIG. 18A is a diagram illustrating a configuration of a lens apparatus 300 according to the second exemplary embodiment at a wide-angle end. FIG. 18B is a diagram illustrating a configuration of a lens apparatus 300 at a telephoto end. The optical system OL is a negative lead type zoom lens. In the lens apparatus 300, a fixed barrel 501, a mount portion 502, a guide barrel 503 and a cam ring 504 are configured similar to the fixed barrel 101, a mount portion 213, a guide barrel 201 and a cam ring 202 in the lens apparatus 200, respectively.

A holding member 511 holds the first lens unit L1 and is moved in an optical axis direction together with the first lens unit L1. A holding member 512 integrally holds the rear lens group LR. A holding member 513 holds the third lens unit L3 that is a focusing lens, and a holding member 515 holds the fifth lens unit L5. When the cum ring 504 is rotated, the holding member 511, the holding member 512 and the holding member 515 are moved in an optical axis direction to perform zooming. When zooming is performed from the wide-angle end to the telephoto end, the first lens unit L1 is moved a distance L.

A motor unit 516, a drive substrate 517 and a control substrate 518 are configured similar to the motor unit 100, the drive substrate 301 and the control substrate 214 in the lens apparatus 200 respectively. More specifically, the drive substrate 517 is a booster unit provided with coils that boost a voltage to be supplied to the motor unit 516. In FIG. 18, one coil 517a is illustrated among the plurality of coils. A detailed drive principle of the motor unit 516 is almost the same as the first exemplary embodiment, and, therefore, is omitted.

Since an optical system OL consisting of the first lens unit L1 having negative refractive power and the rear group LR having positive refractive power is large in mass during focusing, power is to generate large torque in the motor unit 516. Accordingly, the motor unit 516 and the drive substrate 517 tend to grow in size.

Also in the present exemplary embodiment, the drive substrate 517 and the motor unit 516 are disposed being shifted in the optical axis direction, similar to the first exemplary embodiment. With such a disposition, an outer diameter of the lens apparatus can be prevented from increasing. In addition, the drive substrate is disposed on the object side of the motor unit 100. The drive substrate is disposed away from the image surface as much as possible, so that noise generation in the image signal in an imaging device can be reduced. Alternatively, the drive substrate 517 may be disposed on the object side of the control substrate and the motor unit 516 may be disposed on the image side of the control substrate.

The drive substrate 517 is disposed such that a position of the coil 517a is placed away from a most-object-side surface of the optical system at the wide-angle end (an object side surface of the most-object-side lens of the first lens unit L1), equal to or further than an maximum moving amount of the first lens unit L1. The reason for that has been described in the first exemplary embodiment.

Further, in one embodiment, the drive substrate is disposed such that a position of the coil 517a is placed closer to an object side than the most-image-side surface of the optical system OL at the wide-angle end. Moreover, a position of the coil 517a is placed away from the image surface IMG to an object side twice or more as much as a back-focus of the optical system OL at the wide-angle end.

Further, the drive substrate 517 is disposed such that the coil 517a is disposed within an outermost diameter range of the holding member 511 and a straight advance barrel when viewed from an optical axis direction. In such a configuration, unnecessary increase of the outer diameter can be prevented.

Furthermore, the drive substrate 517 is disposed in a neighborhood of the second lens unit L2. More specifically, the second lens unit L2 at the wide-angle end and the drive substrate are disposed so as to at least partially overlap with each other as viewed in a direction orthogonal to optical axis. In such a configuration, the coil 517a can be disposed away from the image IMG without increasing the outer diameter of the lens apparatus 300.

Further, the coil 517a is disposed shifting at least to the advance barrel or to the cam ring. In such a configuration, a noise in the image signal obtained by the imaging device can be decreased.

So far, the exemplary embodiment has been described where the focus unit Lf is the third lens unit has been described. However, the focus unit Lf is not limited to such a configuration.

In addition, the case where the motor unit 516 is the ultrasonic motor has been described. However, motor unit is not limited to such a configuration as long as the motor unit enables the focus unit Lf to move. In addition, the drive substrate 517 is to function as a voltage transformation unit. For example, if it is considering a relation with the motor unit 516, the relevant coil may be used as voltage step-down circuit.

Further, also in the present exemplary embodiment, the lens apparatus 300 satisfies the conditional expressions (1) to (4). Accordingly, the above-mentioned effects can be respectively achieved.

Numerical examples corresponding to the optical systems OL according to the first to sixth exemplary embodiments are described in first to sixth numerical examples. In each of the numerical examples, a surface number indicates an order of the optical surface from the object side. A reference sign r denotes a radius of curvature (mm) of the optical surface, a reference sign d denotes a distance (mm) between adjacent optical surfaces, a reference sign nd denotes a refractive index of a material of the optical member at the d-line, and a reference sign vd denotes an Abbe number of the material of the optical member based on the d-line. The Abbe number vd is represented by, $vd=(Nd-1)/(NF-NC)$, swhere NF, Nd, and Nc represent refractive indices of the material with respect to the Fraunhofer the F-line (486.1 nm), the d-line (587.6 nm), and C-line (656.3 nm).

A part where the distance d is variable indicates that the distance is varied during zooming. The distance d at a representative zoom position is separately described.

The "back focus" BF is described above, and a "total lens length" indicates a length obtained by adding the back focus to the distance on the optical axis from the forefront surface (lens surface on most object side) to the final surface of the optical system OL.

An aspherical surface is marked with an asterisk on right side of the surface number in each of the numerical examples. The aspherical surface shape is represented by, $$X = \frac{H^2/R}{1+\sqrt{1-(1+K)(H/R^2)}} + A4 \cdot H^4 + A6 \cdot H^6 + A8 \cdot H^8 + A10 \cdot H^{10} + A12 \cdot H^{12}$$

(Expression 1)

where the optical axis direction corresponds to the X axis, a direction perpendicular to the optical axis corresponds to an H axis, a light traveling direction is positive, R represents a paraxial radius of curvature, K represents a conic constant, and A4, A6, A8, A10, and A12 represent aspherical surface coefficients.

In each of the aspherical surface coefficients, "e±x" means $10^{\pm x}$.

Further, Table 1 illustrates values corresponding to the conditional expressions (1) to (5) in each of the first to fifth numerical examples.

[First Numerical Example]

Unit: mm

Surface data

| Surface number | r | d | nd | vd | Effective diameter |
|---|---|---|---|---|---|
| 1 | 153.129 | 2.10 | 1.80810 | 22.8 | 77.37 |
| 2 | 68.126 | 9.20 | 1.72916 | 54.7 | 72.90 |
| 3 | 229.651 | 0.15 | | | 72.09 |
| 4 | 56.538 | 8.42 | 1.77250 | 49.6 | 66.23 |
| 5 | 143.922 | (variable) | | | 64.80 |
| 6* | 177.309 | 1.50 | 1.85135 | 40.1 | 39.40 |
| 7 | 21.050 | 9.92 | | | 29.85 |
| 8 | −48.645 | 0.90 | 1.76385 | 48.5 | 27.55 |
| 9 | 25.647 | 8.34 | 1.85478 | 24.8 | 25.49 |
| 10 | −50.942 | 2.34 | | | 26.71 |
| 11 | −31.481 | 5.59 | 1.51742 | 52.4 | 26.99 |
| 12 | −18.463 | 1.20 | 1.88300 | 40.8 | 28.04 |
| 13* | −44.498 | (variable) | | | 31.63 |
| 14(diaphragm) | infinity | 0.30 | | | 35.48 |
| 15 | 65.756 | 4.12 | 1.72916 | 54.7 | 37.69 |
| 16 | 371.024 | 0.15 | | | 37.92 |
| 17 | 45.665 | 9.76 | 1.80400 | 46.6 | 39.09 |
| 18* | −76.624 | 3.63 | | | 38.26 |
| 19 | −51.901 | 1.50 | 1.73800 | 32.3 | 35.75 |
| 20 | 27.845 | 8.48 | 1.49700 | 81.5 | 34.23 |
| 21 | 510.252 | (variable) | | | 34.47 |
| 22 | 39.711 | 7.32 | 1.43875 | 94.7 | 35.21 |
| 23 | −174.360 | 0.15 | | | 34.76 |
| 24 | 37.228 | 7.09 | 1.59522 | 67.7 | 32.96 |
| 25 | −104.496 | 0.30 | | | 32.54 |
| 26 | 87.786 | 1.10 | 1.69895 | 30.1 | 30.89 |
| 27 | 31.012 | 5.54 | | | 29.28 |
| 28* | −1000.000 | 2.00 | 1.85400 | 40.4 | 29.24 |
| 29* | 55.807 | 1.31 | | | 30.31 |
| 30 | 57.476 | 1.20 | 1.48749 | 70.2 | 32.34 |
| 31 | 35.136 | 5.66 | 1.85025 | 30.1 | 33.65 |
| 32 | 172.397 | (variable) | | | 33.86 |
| Image plane | infinity | | | | |

Aspherical surface data

Sixth surface

K = 0.00000e+000 A4 = 5.10348e−006 A6 = −4.34457e−009
A8 = 1.37999e−011 A10 = −2.48862e−014 A12 = 2.63278e−017

13th surface

K = 0.00000e+000 A4 = −1.62945e−006 A6 = −1.93301e−009
A8 = −6.21737e−012 A10 = 2.66590e−014 A12 = −4.35899e−017

18th surface

K = 0.00000e+000 A4 = 2.55792e−006 A6 = −1.69292e−009
A8 = −2.27540e−012 A10 = 4.02496e−015 A12 = −2.17151e−018

28th surface

K = 0.00000e+000 A4 = −4.41081e−005 A6 = 1.28044e−007
A8 = −2.10057e−010 A10 = −1.84393e−013 A12 = 8.43712e−016

29th surface

K = 0.00000e+000 A4 = −3.09220e−005 A6 = 1.56402e−007
A8 = −2.84790e−010 A10 = 1.76646e−013 A12 = 2.07899e−016

Various kinds of data
Zoom ratio 2.35

| | Wide angle | Intermediate | Telephoto |
|---|---|---|---|
| Focal length | 28.90 | 42.99 | 67.90 |
| F-number | 2.05 | 2.05 | 2.06 |
| Half angle of view (degree) | 36.82 | 26.72 | 17.67 |
| Image height | 21.64 | 21.64 | 21.64 |
| Total lens length | 163.98 | 171.82 | 184.65 |
| BF | 27.79 | 35.08 | 42.63 |
| d5 | 4.20 | 15.98 | 29.54 |
| d13 | 16.62 | 8.94 | 2.27 |
| d21 | 6.11 | 2.56 | 0.95 |
| d32 | 27.79 | 35.08 | 42.63 |

Zoom lens unit data

| Unit | Starting surface | Focal length |
|---|---|---|
| 1 | 1 | 105.64 |
| 2 | 6 | −19.62 |
| 3 | 14 | 53.91 |
| 4 | 22 | 48.64 |

[Second Numerical Example]

Unit: mm

Surface data

| Surface number | r | d | nd | vd | Effective diameter |
|---|---|---|---|---|---|
| 1 | 149.047 | 2.10 | 1.80810 | 22.8 | 77.63 |
| 2 | 68.781 | 8.93 | 1.72916 | 54.7 | 72.67 |
| 3 | 223.676 | 0.15 | | | 71.87 |
| 4 | 58.980 | 8.28 | 1.77250 | 49.6 | 66.39 |
| 5 | 159.657 | (variable) | | | 65.01 |
| 6* | 176.499 | 1.50 | 1.76902 | 49.3 | 40.92 |
| 7 | 20.208 | 9.19 | | | 30.20 |
| 8 | −63.499 | 0.90 | 1.76385 | 48.5 | 29.27 |
| 9 | 24.792 | 8.37 | 1.85478 | 24.8 | 26.74 |
| 10 | −55.595 | 1.57 | | | 25.71 |
| 11 | −41.903 | 5.18 | 1.48749 | 70.2 | 25.91 |
| 12 | −19.594 | 1.20 | 1.88300 | 40.8 | 26.61 |
| 13* | −74.922 | (variable) | | | 29.60 |
| 14(diaphragm) | infinity | 0.30 | | | 32.51 |
| 15 | 64.431 | 4.46 | 1.72916 | 54.7 | 34.49 |
| 16 | infinity | 0.15 | | | 34.82 |
| 17 | 40.646 | 8.99 | 1.80400 | 46.6 | 35.97 |
| 18* | −88.160 | 4.14 | | | 35.05 |
| 19 | −47.780 | 1.50 | 1.73800 | 32.3 | 32.29 |
| 20 | 25.016 | 7.71 | 1.49700 | 81.5 | 30.89 |
| 21 | 248.460 | (variable) | | | 31.13 |
| 22 | 33.078 | 6.71 | 1.43875 | 94.7 | 31.98 |
| 23 | −469.348 | 0.15 | | | 31.50 |
| 24 | 40.254 | 6.46 | 1.59522 | 67.7 | 32.14 |
| 25 | −101.746 | 0.30 | | | 31.78 |
| 26 | 59.526 | 4.51 | 1.49700 | 81.5 | 30.01 |
| 27 | −177.956 | 1.00 | 1.80610 | 33.3 | 28.99 |
| 28 | 44.079 | 4.23 | | | 27.51 |
| 29* | −1000.000 | 3.00 | 1.85400 | 40.4 | 27.41 |
| 30* | 109.178 | 3.26 | | | 28.71 |
| 31 | −45.198 | 1.20 | 1.48749 | 70.2 | 29.04 |
| 32 | 45.131 | 6.42 | 2.00100 | 29.1 | 34.58 |
| 33 | −169.151 | (variable) | | | 35.20 |
| Image plane | infinity | | | | |

Aspherical surface data

Sixth surface

K = 0.00000e+000 A4 = 4.40628e−006 A6 = −2.80374e−009
A8 = 3.12113e−012 A10 = 2.43107e−015 A12 = −2.17038e−018

13th surface

K = 0.00000e+000 A4 = −2.36140e−006 A6 = −1.08356e−009
A8 = −1.99552e−011 A10 = 1.00829e−013 A12 = −1.77388e−016

18th surface

K = 0.00000e+000 A4 = 2.15576e−006 A6 = −2.33619e−009
A8 = −1.82040e−012 A10 = −1.99976e−016 A12 = 4.53234e−018

29th surface

K = 0.00000e+000 A4 = −4.82313e−005 A6 = 1.54634e−008
A8 = 3.00393e−010 A10 = −1.04531e−012 A12 = 1.51938e−015

-continued

Unit: mm

30th surface

K = 0.00000e+000 A4 = −2.82244e−005 A6 = 5.87972e−008
A8 = 2.35247e−010 A10 = −8.07024e−013 A12 = 9.56680e−016

Various kinds of data
Zoom ratio 2.35

|  | Wide angle | Intermediate | Telephoto |
| --- | --- | --- | --- |
| Focal length | 28.91 | 42.97 | 67.89 |
| F-number | 2.05 | 2.05 | 2.06 |
| Half angle of view (degree) | 36.81 | 26.72 | 17.68 |
| Image height | 21.64 | 21.64 | 21.64 |
| Total lens length | 155.86 | 165.41 | 178.09 |
| BF | 19.57 | 25.90 | 33.38 |
| d5 | 3.86 | 16.61 | 29.64 |
| d13 | 14.92 | 8.44 | 2.27 |
| d21 | 5.66 | 2.61 | 0.95 |
| d33 | 19.57 | 25.90 | 33.38 |

Zoom lens unit data

| Unit | Starting surface | Focal length |
| --- | --- | --- |
| 1 | 1 | 105.82 |
| 2 | 6 | −18.96 |
| 3 | 14 | 48.62 |
| 4 | 22 | 41.98 |

[Third Numerical Example]

Unit: mm

Surface data

| Surface number | r | d | nd | vd | Effective diameter |
| --- | --- | --- | --- | --- | --- |
| 1 | 185.690 | 2.10 | 1.89286 | 20.4 | 70.03 |
| 2 | 102.616 | 5.96 | 1.59522 | 67.7 | 67.25 |
| 3 | 506.983 | 0.15 |  |  | 66.40 |
| 4 | 60.547 | 6.61 | 1.76385 | 48.5 | 60.07 |
| 5 | 145.490 | (variable) |  |  | 58.57 |
| 6* | 196.972 | 1.40 | 1.88300 | 40.8 | 38.96 |
| 7 | 23.897 | 8.29 |  |  | 31.23 |
| 8 | −66.605 | 1.10 | 1.59282 | 68.6 | 30.42 |
| 9 | 27.915 | 4.65 | 1.90366 | 31.3 | 28.59 |
| 10 | 94.203 | 0.50 |  |  | 28.91 |
| 11 | 115.549 | 8.99 | 1.72825 | 28.5 | 29.11 |
| 12 | −23.106 | 1.10 | 1.88300 | 40.8 | 29.78 |
| 13 | −77.496 | 3.91 |  |  | 31.56 |
| 14 | −25.285 | 1.20 | 1.95375 | 32.3 | 31.56 |
| 15 | −39.935 | (variable) |  |  | 34.13 |
| 16(diaphragm) | infinity | 0.30 |  |  | 38.87 |
| 17 | 57.217 | 5.76 | 1.80400 | 46.6 | 42.54 |
| 18 | −14821.675 | 0.15 |  |  | 42.60 |
| 19 | 48.154 | 8.94 | 1.77250 | 49.5 | 42.92 |
| 20* | −101.713 | 5.94 |  |  | 42.12 |
| 21 | −56.728 | 1.40 | 1.85025 | 30.1 | 37.21 |
| 22 | 29.702 | 7.73 | 1.49700 | 81.5 | 35.67 |
| 23 | 318.842 | (variable) |  |  | 36.07 |
| 24 | 46.088 | 5.77 | 1.49700 | 81.5 | 37.51 |
| 25 | −2453.348 | 0.15 |  |  | 37.36 |
| 26 | 44.616 | 6.25 | 1.59522 | 67.7 | 36.94 |
| 27 | −342.571 | 0.25 |  |  | 36.79 |
| 28 | 40.473 | 1.40 | 2.00100 | 29.1 | 35.76 |
| 29 | 33.629 | 9.25 | 1.49700 | 81.5 | 34.58 |
| 30 | −70.003 | 0.15 |  |  | 33.63 |
| 31* | 180.669 | 1.40 | 1.85400 | 40.4 | 31.91 |
| 32 | 24.228 | 3.96 | 1.48749 | 70.2 | 30.02 |
| 33 | 38.371 | 6.68 |  |  | 30.09 |
| 34 | −35.992 | 1.40 | 1.59522 | 67.7 | 30.23 |
| 35 | 42.748 | 6.75 | 2.00069 | 25.5 | 36.02 |
| 36 | −218.385 | (variable) |  |  | 36.59 |
| Image plane | infinity |  |  |  |  |

Aspherical surface data

Sixth surface

K = 0.00000e+000 A4 = 4.39158e−006 A6 = −9.82898e−010
A8 = 2.69004e−012 A10 = −1.15093e−015 A12 = 6.67612e−018

20th surface

K = 0.00000e+000 A4 = 2.99070e−006 A6 = −2.29872e−009
A8 = −1.18958e−012 A10 = 3.78487e−015 A12 = −2.25763e−018

31st surface

K = 0.00000e+000 A4 = −1.47587e−005 A6 = −1.30088e−008
A8 = 2.79729e−011 A10 = −7.52442e−014 A12 = 1.40883e−016

Various kinds of data
Zoom ratio 2.70

|  | Wide angle | Intermediate | Telephoto |
| --- | --- | --- | --- |
| Focal length | 28.84 | 44.96 | 77.80 |
| F-number | 2.06 | 2.06 | 2.06 |
| Half angle of view (degree) | 36.87 | 25.70 | 15.54 |
| Image height | 21.64 | 21.64 | 21.64 |
| Total lens length | 162.79 | 173.70 | 191.92 |
| BF | 15.28 | 23.29 | 33.80 |
| d5 | 3.47 | 18.39 | 35.68 |
| d15 | 16.63 | 8.99 | 1.85 |
| d23 | 7.83 | 3.44 | 1.00 |
| d36 | 15.28 | 23.29 | 33.80 |

Zoom lens unit data

| Unit | Starting surface | Focal length |
| --- | --- | --- |
| 1 | 1 | 120.53 |
| 2 | 6 | −20.85 |
| 3 | 16 | 52.49 |
| 4 | 24 | 40.08 |

[Fourth Numerical Example]

Unit: mm

| Surface number | r | d | nd | vd | Effective diameter |
| --- | --- | --- | --- | --- | --- |
| 1 | 150.854 | 2.10 | 1.80810 | 22.8 | 80.04 |
| 2 | 67.631 | 9.20 | 1.72916 | 54.7 | 72.45 |
| 3 | 234.942 | 0.15 |  |  | 71.01 |
| 4 | 55.670 | 8.42 | 1.77250 | 49.6 | 59.72 |
| 5 | 166.444 | (variable) |  |  | 56.37 |
| 6* | 141.978 | 1.50 | 1.85135 | 40.1 | 44.03 |
| 7 | 21.106 | 9.92 |  |  | 31.77 |
| 8 | −47.855 | 0.90 | 1.76385 | 48.5 | 31.77 |
| 9 | 26.216 | 8.34 | 1.85478 | 24.8 | 28.81 |
| 10 | −52.510 | 2.34 |  |  | 27.92 |
| 11 | −31.512 | 5.59 | 1.51742 | 52.4 | 27.23 |
| 12 | −18.748 | 1.20 | 1.88300 | 40.8 | 28.33 |
| 13* | −42.199 | (variable) |  |  | 31.78 |
| 14(diaphragm) | infinity | 0.30 |  |  | 35.42 |
| 15 | 57.610 | 4.12 | 1.72916 | 54.7 | 37.80 |
| 16 | 181.689 | 0.15 |  |  | 37.91 |
| 17 | 39.841 | 9.76 | 1.80400 | 46.6 | 39.02 |
| 18* | −112.072 | 3.63 |  |  | 37.86 |
| 19 | −76.051 | 1.50 | 1.73800 | 32.3 | 35.10 |
| 20 | 22.014 | 8.48 | 1.49700 | 81.5 | 32.24 |
| 21 | 77.733 | 9.98 |  |  | 32.28 |
| 22 | 41.069 | 7.32 | 1.43875 | 94.7 | 35.15 |
| 23 | −155.403 | 0.15 |  |  | 34.83 |
| 24 | 32.330 | 7.09 | 1.59522 | 67.7 | 34.40 |

-continued

Unit: mm

| | | | | | |
|---|---|---|---|---|---|
| 25 | −190.252 | 0.30 | | | 34.03 |
| 26 | 78.705 | 1.10 | 1.69895 | 30.1 | 32.53 |
| 27 | 29.270 | 6.20 | | | 30.82 |
| 28* | infinity | 2.00 | 1.85400 | 40.4 | 30.84 |
| 29* | 72.196 | 0.50 | | | 32.16 |
| 30 | 49.371 | 1.20 | 1.48749 | 70.2 | 34.85 |
| 31 | 34.914 | 5.66 | 1.85025 | 30.1 | 35.73 |
| 32 | 105.610 | (variable) | | | 35.71 |
| Image plane | infinity | | | | |

Aspherical surface data

Sixth surface

K = 0.00000e+000 A4 = 4.40847e−006 A6 = −6.65502e−009
A8 = 2.33218e−011 A10 = −4.27753e−014 A12 = 3.97452e−017

13th surface

K = 0.00000e+000 A4 = −1.89550e−006 A6 = −1.66337e−009
A8 = −5.39284e−012 A10 = 9.54074e−015 A12 = 2.00846e−018

18th surface

K = 0.00000e+000 A4 = 3.02728e−006 A6 = −3.04809e−009
A8 = 1.61555e−012 A10 = −6.28747e−015 A12 = 8.01506e−018

28th surface

K = 0.00000e+000 A4 = −5.48184e−005 A6 = 1.47546e−007
A8 = −1.54308e−010 A10 = 5.34243e−015 A12 = 3.31189e−017

29th surface

K = 0.00000e+000 A4 = −4.52422e−005 A6 = 1.72898e−007
A8 = −2.36785e−010 A10 = 1.82207e−013 A12 = −7.90015e−017

Various kinds of data
Zoom ratio 2.10

| | Wide angle | Intermediate | Telephoto |
|---|---|---|---|
| Focal length | 29.50 | 55.96 | 62.01 |
| F-number | 2.05 | 2.05 | 2.05 |
| Half angle of view (degree) | 36.26 | 21.14 | 19.23 |
| Image height | 21.64 | 21.64 | 21.64 |
| Total lens length | 170.24 | 182.90 | 186.28 |
| BF | 27.86 | 44.59 | 45.27 |
| d5 | 3.30 | 15.88 | 19.84 |
| d13 | 19.97 | 3.33 | 2.06 |
| d32 | 27.86 | 44.59 | 45.27 |

Zoom lens unit data

| Unit | Starting surface | Focal length |
|---|---|---|
| 1 | 1 | 95.47 |
| 2 | 6 | −20.79 |
| 3 | 14 | 38.89 |

[Fifth Numerical Example]

Unit: mm

Surface data

| Surface number | r | d | nd | vd | Effective diameter |
|---|---|---|---|---|---|
| 1 | 155.037 | 2.10 | 1.80810 | 22.8 | 81.70 |
| 2 | 70.116 | 9.20 | 1.72916 | 54.7 | 76.52 |
| 3 | 195.501 | 0.15 | | | 75.57 |
| 4 | 57.008 | 8.42 | 1.77250 | 49.6 | 69.08 |
| 5 | 142.617 | (variable) | | | 68.11 |
| 6* | 214.923 | 1.50 | 1.85135 | 40.1 | 40.56 |
| 7 | 21.096 | 9.92 | | | 30.15 |
| 8 | −47.358 | 0.90 | 1.76385 | 48.5 | 27.97 |
| 9 | 25.320 | 8.34 | 1.85478 | 24.8 | 25.67 |
| 10 | −50.621 | 2.34 | | | 25.15 |

-continued

Unit: mm

| | | | | | |
|---|---|---|---|---|---|
| 11 | −29.869 | 5.59 | 1.51742 | 52.4 | 25.45 |
| 12 | −18.475 | 1.20 | 1.88300 | 40.8 | 26.78 |
| 13* | −41.822 | (variable) | | | 29.88 |
| 14(diaphragm) | infinity | 0.30 | | | 33.57 |
| 15 | 66.026 | 4.12 | 1.72916 | 54.7 | 35.48 |
| 16 | 364.260 | 0.15 | | | 35.76 |
| 17 | 45.771 | 9.76 | 1.80400 | 46.6 | 36.84 |
| 18* | −76.427 | 3.63 | | | 35.94 |
| 19 | −51.795 | 1.50 | 1.73800 | 32.3 | 33.65 |
| 20 | 27.337 | 8.48 | 1.49700 | 81.5 | 32.48 |
| 21 | 627.170 | (variable) | | | 32.81 |
| 22 | 39.190 | 7.32 | 1.43875 | 94.7 | 33.59 |
| 23 | −169.944 | 0.15 | | | 33.12 |
| 24 | 35.976 | 7.09 | 1.59522 | 67.7 | 33.59 |
| 25 | −105.493 | 0.30 | | | 33.23 |
| 26 | 87.336 | 1.10 | 1.69895 | 30.1 | 31.45 |
| 27 | 30.956 | 5.54 | | | 29.74 |
| 28* | −979.971 | 2.00 | 1.85400 | 40.4 | 29.70 |
| 29* | 60.597 | (variable) | | | 30.74 |
| 30 | 58.679 | 1.20 | 1.48749 | 70.2 | 33.01 |
| 31 | 36.321 | 5.66 | 1.85025 | 30.1 | 34.26 |
| 32 | 171.275 | (variable) | | | 34.47 |
| Image plane | infinity | | | | |

Aspherical surface data

Sixth surface

K = 0.00000e+000 A4 = 5.33975e−006 A6 = −4.16853e−009
A8 = 1.20950e−011 A10 = −2.07542e−014 A12 = 2.33792e−017

13th surface

K = 0.00000e+000 A4 = −1.42782e−006 A6 = −2.17995e−009
A8 = −3.88250e−012 A10 = 2.49763e−014 A12 = −4.87268e−017

18th surface

K = 0.00000e+000 A4 = 2.64561e−006 A6 = −1.91946e−009
A8 = −2.05520e−012 A10 = 3.81185e−015 A12 = −1.75514e−018

28th surface

K = 0.00000e+000 A4 = −4.42649e−005 A6 = 1.28218e−007
A8 = −2.04999e−010 A10 = −1.48969e−013 A12 = 7.20523e−016

29th surface

K = 0.00000e+000 A4 = −3.10150e−005 A6 = 1.57698e−007
A8 = −2.81303e−010 A10 = 1.78277e−013 A12 = 1.99011e−016

Various kinds of data
Zoom ratio 2.19

| | Wide angle | Intermediate | Telephoto |
|---|---|---|---|
| Focal length | 26.96 | 38.38 | 59.03 |
| F-number | 2.05 | 2.05 | 2.06 |
| Half angle of view (degree) | 38.75 | 29.41 | 20.13 |
| Image height | 21.64 | 21.64 | 21.64 |
| Total lens length | 162.55 | 169.75 | 183.06 |
| BF | 26.37 | 32.98 | 40.70 |
| d5 | 4.84 | 15.74 | 29.53 |
| d13 | 16.11 | 8.89 | 2.40 |
| d21 | 5.83 | 2.61 | 0.98 |
| d29 | 1.45 | 1.57 | 1.48 |
| d32 | 26.37 | 32.98 | 40.70 |

Zoom lens unit data

| Unit | Starting surface | Focal length |
|---|---|---|
| 1 | 1 | 114.61 |
| 2 | 6 | −19.54 |
| 3 | 14 | 54.33 |
| 4 | 22 | 75.16 |
| 5 | 30 | 73.67 |

[Fifth Numerical Example]

Unit: mm

Surface data

| Surface number | r | d | nd | vd | Effective diameter |
|---|---|---|---|---|---|
| 1 | 30.000 | 1.60 | 1.77250 | 49.6 | 37.45 |
| 2 | 18.850 | 4.50 | | | 31.64 |
| 3* | 26.555 | 2.50 | 1.53110 | 55.9 | 31.50 |
| 4* | 22.754 | 4.00 | | | 29.33 |
| 5 | −586.400 | 1.25 | 1.69680 | 55.5 | 29.45 |
| 6* | 21.473 | 0.50 | | | 26.46 |
| 7 | 21.403 | 4.50 | 1.80810 | 22.8 | 26.58 |
| 8 | 43.781 | (variable) | | | 25.57 |
| 9* | 113.037 | 2.00 | 1.53110 | 55.9 | 13.30 |
| 10 | −62.214 | (variable) | | | 13.30 |
| 11 | −25.577 | 1.00 | 1.53110 | 55.9 | 12.10 |
| 12* | 69.090 | (variable) | | | 12.48 |
| 13 | 3436.015 | 2.00 | 1.53110 | 55.9 | 13.25 |
| 14* | −32.138 | 0.15 | | | 13.56 |
| 15 | 24.000 | 4.00 | 1.60311 | 60.6 | 13.96 |
| 16 | −23.373 | 0.75 | 1.84666 | 23.9 | 13.86 |
| 17 | −53.850 | 1.00 | | | 13.91 |
| 18(diaphragm) | infinity | (variable) | | | 13.68 |
| 19 | −775.077 | 0.60 | 1.58144 | 40.8 | 12.14 |
| 20 | 13.120 | 2.10 | 1.80610 | 33.3 | 11.79 |
| 21 | 23.477 | 1.00 | | | 11.40 |
| 22 | infinity | (variable) | | | 11.37 |
| 23 | 1993.370 | 1.70 | 1.53110 | 55.9 | 16.20 |
| 24* | 129.782 | 0.90 | | | 16.95 |
| 25 | 39.224 | 3.30 | 1.48749 | 70.2 | 18.09 |
| 26 | −43.398 | (variable) | | | 18.47 |
| Image plane | infinity | | | | |

Aspherical surface data

Third Surface

K = 4.32691e−001 A 4 = −2.01075e−005 A 6 = −5.77042e−008
A 8 = 2.18817e−010 A10 = 7.74314e−014

Fourth Surface

K = −8.80639e−001 A 4 = −1.89233e−005 A 6 = −8.57520e−008
A 8 = 4.23972e−010 A10 = −5.11033e−014

Unit: mm

Ninth Surface

K = 6.06800e+001 A 4 = −2.73271e−006 A 6 = −9.63836e−008
A 8 = 1.03681e−009

Twelfth Surface

K = 3.45986e+001 A 4= −1.72460e−006 A 6 = −2.27910e−007
A 8 = 2.66175e−009

14th Surface

K = 6.16063e+000 A 4 = 1.73713e−005 A 6 = 1.56379e−007
A 8 = −5.99782e−010

24th Surface

K = −5.25180e+001 A 4 = 3.24345e−005 A 6 = 6.21489e−008
A 8 = −4.19270e−010 A10 = 4.06004e−012

Various kinds of data
Zoom ratio 2.88

| | Wide angle | Intermediate | Telephoto |
|---|---|---|---|
| Focal length | 18.58 | 36.51 | 53.49 |
| F-number | 3.56 | 4.68 | 5.87 |
| Angle of view | 36.32 | 20.51 | 14.32 |
| Image height | 13.66 | 13.66 | 13.66 |
| Total lens length | 125.55 | 116.84 | 125.36 |
| BF | 34.95 | 50.70 | 66.45 |
| d8 | 32.96 | 8.50 | 1.28 |
| d10 | 3.15 | 3.89 | 4.29 |
| d12 | 2.34 | 1.60 | 1.20 |
| d18 | 3.38 | 9.00 | 12.35 |
| d22 | 9.42 | 3.79 | 0.44 |
| d26 | 34.95 | 50.70 | 66.45 |

Zoom lens unit data

| Unit | Starting surface | Focal length |
|---|---|---|
| 1 | 1 | −29.86 |
| 2 | 9 | 75.86 |
| 3 | 11 | −35.02 |
| 4 | 13 | 21.61 |
| 5 | 19 | −57.76 |
| 6 | 23 | 50.77 |

TABLE 1

| Conditional expression | First numerical example | Second numerical example | Third numerical example | Fourth numerical example | Fifth numerical example | sixth numerical example |
|---|---|---|---|---|---|---|
| (1) \|M1\|/fw | 0.715 | 0.769 | 1.010 | 0.544 | 0.761 | 0.761 |
| (2) Blobj_ea/B2img_ea | 2.446 | 2.623 | 2.052 | 2.518 | 2.734 | 2.734 |
| (3) B3max_ea/fw | 1.352 | 1.244 | 1.488 | 1.323 | 1.367 | 1.367 |
| (4) Sk_w/fw | 0.961 | 0.677 | 0.530 | 0.944 | 0.978 | 0.978 |
| (5) T2/To | 0.941 | 0.750 | 0.717 | 0.431 | 4.347 | 4.437 |

[Exemplary Embodiment of Camera System]

Figure 19:
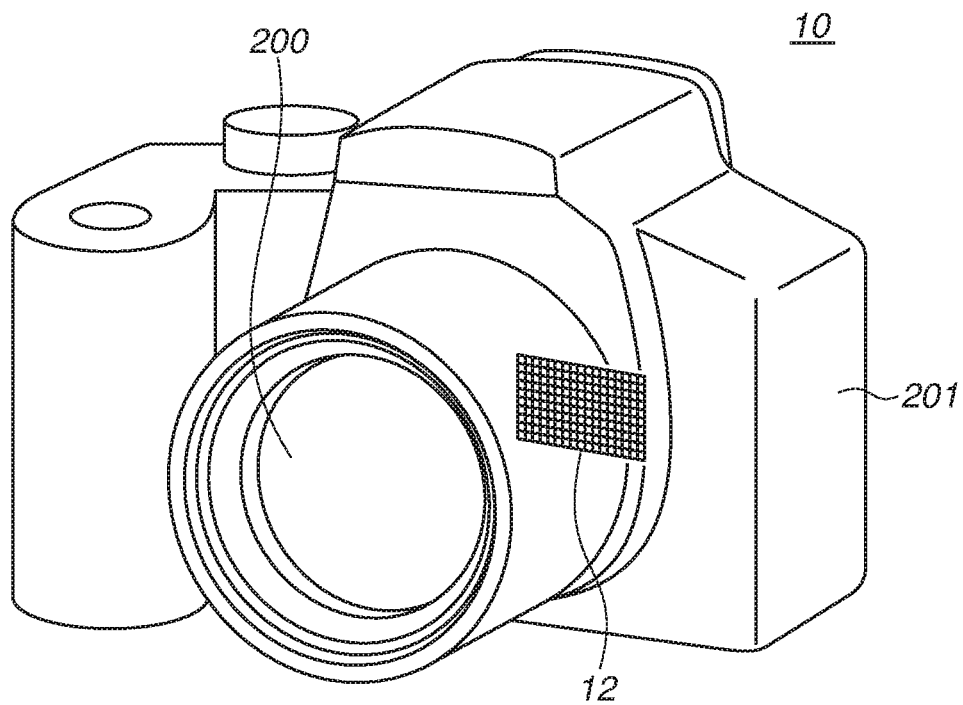
FIG. 19 is a diagram illustrating a configuration of a camera system according to the exemplary embodiment of the disclosure.

FIG. 19 is a diagram illustrating a configuration of a camera system 10 according to the exemplary embodiment of the disclosure. The camera system 10 includes the lens apparatus 200 and a light receiving device (imaging device) 12 that receives light of the image formed by the optical system OL (not illustrated in FIG. 19) of the lens apparatus 200 and generates a captured image.

The lens apparatus 200 may be detachable from the camera body 201, or the lens apparatus 200 and the camera body 201 may be integrally configured (so as not to be detachable). In a case where the lens apparatus 200 and the camera body 201 are integrally configured, the lens apparatus 200 may not include the mount ring 212 and the mount portion 213.

The camera body 201 may be a single-lens reflex camera or a mirror-less camera.

Such a camera system makes it possible to reduce the noise in the image signal acquired by the imaging device 12 while achieving high optical performance Although the exemplary embodiments of the disclosure have been described above, the disclosure is not limited to these exemplary embodiments, and can be variously modified and altered within the scope of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-163187, filed Aug. 31, 2018, and No. 2019-136290, filed Jul. 24, 2019, which are hereby incorporated by reference herein in their entirety.

What is claimed is:

1. A lens apparatus, comprising:
   an optical system comprising a first lens unit having positive refractive power, a second lens unit having negative refractive power and a rear lens group having positive refractive power as a whole in an entire zoom range that are disposed in this order from object side to image side, a distance of adjacent lens units being varied during zooming, and the first lens unit being moved toward the object side during zooming from a wide-angle end to a telephoto end;
   a voltage transformation unit including coils; and
   a motor unit configured to be driven by a voltage from the voltage transformation unit and to move a part of the lens units in the optical system during focusing,
   wherein the coil is disposed at a position that is separated from a position of a most object-side surface of the optical system at the wide-angle end, toward the image side by equal to or greater than a maximum moving amount of the first lens unit, and is closer to the object side than both of the most object-side positon of the motor unit at the wide-angle end and a most image-side surface of the optical system at the wide-angle end.

2. The lens apparatus according to claim 1, further comprising a control unit configured to control driving of the motor unit,
   wherein the most object-side positon of the motor unit at the wide-angle end is disposed further on the object side than the control unit.

3. The lens apparatus according to claim 1, further comprising a holding member configured to hold the first lens unit and to move together with the first lens unit during zooming,
   wherein the coil is disposed within an outermost diameter range of the holding member when viewed from an optical axis direction.

4. The lens apparatus according to claim 1, wherein the coil is disposed at a position separated from an image plane by twice or more as much as a back focus of the optical system at the wide-angle end.

5. The lens apparatus according to claim 1, further comprising:
   a guide barrel including a guide groove configured to guide the part of the lens units; and
   a cam ring that includes a cam follower configured to engage with the guide groove, and a cam groove configured to engage with the cam follower,
   wherein the coil is disposed to be displaced from at least one of the guide groove and the cam groove.

6. The lens apparatus according to claim 1,
   wherein the voltage transformation unit includes a plurality of coils, and
   wherein the plurality of coils is distributed and arranged in a circumferential direction of the optical system.

7. The lens apparatus according to claim 1, further comprising a substrate including a plurality of surfaces that are not parallel to one another, in the circumferential direction of the optical system,
   wherein the plurality of coils is distributed and arranged on the plurality of surfaces of the substrate.

8. The lens apparatus according to claim 1, wherein the following inequality is satisfied, $$0.5 < |M1|/fw < 1.3,$$

where M1 represents a moving amount of the first lens unit during zooming from the wide-angle end to the telephoto end, and fw represents a focal length of the optical system at the wide-angle end.

9. The lens apparatus according to claim 1, wherein the optical system satisfies the following inequality, $$1.5 < B1obj\_ea/B2img\_ea < 3.0,$$

where B1obj_ea represents an effective diameter of a most object-side surface of the first lens unit, and B2img_ea represents an effective diameter of a most image-side surface of the second lens unit.

10. The lens apparatus according to claim 1, wherein the optical system satisfies the following inequality, $$1.0 < B3max\_ea/fw < 2.0,$$

where the lens unit disposed on the most object side in the rear lens group is a third lens unit, B3max_ea represents a maximum effective diameter among effective diameters of lenses configuring the third lens unit, and fw represents a focal length of the optical system at the wide-angle end.

11. The lens apparatus according to claim 1, wherein the optical system satisfies the following inequality, $$0.3 < skw/fw < 1.1,$$

where skw represents a back focus of the optical system at the wide-angle end, and fw represents a focal length of the optical system at the wide-angle end.

12. The lens apparatus according to claim 1, wherein the optical system satisfies the following inequality, $$0.3 < T2/To < 1.0,$$

where T2 represents a distance on the optical axis from a most object-side surface of the second lens unit to a most image-side surface of the second lens unit, and To represents a distance on the optical axis from a most object-side surface of a final lens unit disposed on the most image side, among lens units included in the rear lens group, to a most image-side surface of the final lens unit.

13. The lens apparatus according to claim 1, wherein the part of the lens units is the second lens unit, and
wherein the second lens unit is moved toward the object side during focusing from an infinite-distance object to a short-distance object.

14. The lens apparatus according to claim 1, wherein the voltage transformation unit includes a booster circuit configured to boost an input voltage and to output the boosted voltage.

15. A camera system, comprising:
a lens apparatus; and
a light receiving device configured to receive light of an image formed by an optical system,
wherein the lens apparatus includes the optical system, a voltage transformation unit, and an motor unit, the optical system consisting of a first lens unit having positive refractive power, a second lens unit having negative refractive power, and a rear lens group having positive refractive power as a whole in an entire zoom range that are disposed in this order from object side to image side, a distance of adjacent lens units being varied in zooming, the first lens unit being moved toward the object side in zooming from a wide-angle end to a telephoto end, the voltage transformation unit including coils, and the motor unit being configured to be driven by a voltage from the voltage transformation unit and to move a part of the lens units in the optical system during focusing,
wherein the coil is disposed at a position that is separated from a position of a most object-side surface of the optical system at the wide-angle end toward the image side by equal to or greater than a maximum moving amount of the first lens unit, and is closer to the object side than both of the most object-side positon of the motor unit at the wide-angle end and a most image-side surface of the optical system at the wide-angle end.

16. A lens apparatus, comprising:
an optical system comprising a first lens unit having negative refractive power, and a rear lens group having positive refractive power as a whole in an entire zoom range that are disposed in this order from object side to image side, a distance of adjacent lens units being varied during zooming, and the first lens unit being moved toward the object side during zooming from a wide-angle end to a telephoto end;
a voltage transformation unit including coil; and
a motor unit configured to be driven by a voltage from the voltage transformation unit and to move a part of the lens units in the optical system during focusing,
wherein the coil is disposed at a position that is separated from a position of a most object-side surface of the optical system at the wide-angle end, toward the image side by equal to or greater than a maximum moving amount of the first lens unit, and is closer to the object side than both of the most object-side positon of the motor unit at the wide-angle end and a most image-side surface of the optical system at the wide-angle end.

17. The lens apparatus according to claim 16, further comprising a control unit configured to control driving of the motor unit,
wherein the most image-side positon of the motor unit at the wide-angle end is disposed further on the object side than the control unit.

18. The lens apparatus according to claim 16, further comprising a holding member configured to hold the first lens unit and to move together with the first lens unit during zooming,
wherein the coil is disposed within an outermost diameter range of the holding member when viewed from an optical axis direction.

19. The lens apparatus according to claim 16, wherein the coil is disposed at a position separated from an image plane by twice or more as much as a back focus of the optical system at the wide-angle end.

20. The lens apparatus according to claim 16, further comprising:
a guide barrel including a guide groove configured to guide the part of the lens units; and
a cam ring that includes a cam follower configured to engage with the guide groove, and a cam groove configured to engage with the cam follower,
wherein the coil is disposed to be displaced from at least one of the guide groove and the cam groove.

21. The lens apparatus according to claim 16,
wherein the voltage transformation unit includes a plurality of coils, and
wherein the plurality of coils is distributed and arranged in a circumferential direction of the optical system.

22. The lens apparatus according to claim 16, further comprising a substrate including a plurality of surfaces that are not parallel to one another, in the circumferential direction of the optical system,
wherein the plurality of coils is distributed and arranged on the plurality of surfaces of the substrate.

23. The lens apparatus according to claim 16, wherein the following inequality is satisfied, $$0.5<|M1|/fw<1.3,$$

where M1 represents a moving amount of the first lens unit during zooming from the wide-angle end to the telephoto end, and fw represents a focal length of the optical system at the wide-angle end.

24. The lens apparatus according to claim 16, wherein the optical system satisfies the following inequality, $$1.5<B1obj\_ea/B2img\_ea<3.0,$$

where B1obj_ea represents an effective diameter of a most object-side surface of the first lens unit, and B2img_ea represents an effective diameter of a most image-side surface of the second lens unit.

25. The lens apparatus according to claim 16, wherein the optical system satisfies the following inequality, $$1.0<B3max\_ea/fw<2.0,$$

where the lens unit disposed on the most object side in the rear lens group is a third lens unit, B3max_ea represents a maximum effective diameter among effective diameters of lenses configuring the third lens unit, and fw represents a focal length of the optical system at the wide-angle end.

26. The lens apparatus according to claim 1, wherein the optical system satisfies the following inequality, $$0.3<skw/fw<1.1,$$

where skw represents a back focus of the optical system at the wide-angle end, and fw represents a focal length of the optical system at the wide-angle end.

27. The lens apparatus according to claim 16,
wherein the rear lens group includes a second lens unit that is disposed adjacently toward an image side of the first lens unit, and a third lens unit that is disposed adjacently toward an image side of the second lens unit,
wherein the part of the lens units is the third lens unit, and
wherein the third lens unit is moved toward the object side during focusing from an infinite-distance object to a short-distance object.

28. The lens apparatus according to claim 16, wherein the voltage transformation unit includes a booster circuit configured to boost an input voltage and to output the boosted voltage.

29. A camera system, comprising:
a lens apparatus; and
a light receiving device configured to receive light of an image formed by an optical system,
wherein the lens apparatus includes the optical system, a voltage transformation unit, and a motor unit, the optical system consisting of a first lens unit having negative refractive power, and a rear lens group having positive refractive power as a whole in an entire zoom range that are disposed in this order from object side to image side, a distance of adjacent lens units being varied in zooming, the first lens unit being moved toward the object side in zooming from a wide-angle end to a telephoto end, the voltage transformation unit including a coil, and the motor unit being configured to be driven by a voltage from the voltage transformation unit and to move a part of the lens units in the optical system during focusing,
wherein the coil is disposed at a position that is separated from a position of a most object-side surface of the optical system at the wide-angle end, toward the image side by equal to or greater than a maximum moving amount of the first lens unit, and is closer to the object side than both of the most object-side positon of the motor unit at the wide-angle end and a most image-side surface of the optical system at the wide-angle end.

* * * * *